(12) United States Patent
El-Ghoroury et al.

(10) Patent No.: US 7,889,430 B2
(45) Date of Patent: Feb. 15, 2011

(54) LED-BASED HIGH EFFICIENCY ILLUMINATION SYSTEMS FOR USE IN PROJECTION SYSTEMS

(75) Inventors: Hussein S. El-Ghoroury, Carlsbad, CA (US); Dale A. McNeill, Encinitas, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 347 days.

(21) Appl. No.: 11/502,288

(22) Filed: Aug. 9, 2006

(65) Prior Publication Data

US 2007/0263298 A1    Nov. 15, 2007

Related U.S. Application Data

(60) Provisional application No. 60/799,164, filed on May 9, 2006.

(51) Int. Cl.
*G02B 27/30* (2006.01)
(52) U.S. Cl. ...................................... 359/641
(58) Field of Classification Search ............... 359/624, 359/726, 549, 618
See application file for complete search history.

(56) References Cited

U.S. PATENT DOCUMENTS

| 5,146,248 | A | * | 9/1992 | Duwaer et al. ............... 353/122 |
| 5,757,557 | A | | 5/1998 | Medvedev et al. |
| 6,120,166 | A | * | 9/2000 | Price ........................... 362/302 |
| 6,144,536 | A | | 11/2000 | Zimmerman et al. |
| 6,520,643 | B1 | * | 2/2003 | Holman et al. ................ 353/20 |
| 6,547,423 | B2 | | 4/2003 | Marshall et al. |
| 6,639,733 | B2 | | 10/2003 | Minano et al. |
| 6,869,206 | B2 | | 3/2005 | Zimmerman et al. |
| 6,896,381 | B2 | | 5/2005 | Benitez et al. |
| 6,960,872 | B2 | | 11/2005 | Beeson et al. |
| 6,962,426 | B2 | | 11/2005 | Slobodin |
| 7,286,296 | B2 | * | 10/2007 | Chaves et al. ............... 359/641 |
| 7,306,352 | B2 | * | 12/2007 | Sokolov et al. ............. 362/341 |

(Continued)

FOREIGN PATENT DOCUMENTS

EP    1 496 709 A1    1/2005

(Continued)

OTHER PUBLICATIONS

International Search Report and Written Opinion of the International Searching Authority Jan. 16, 2008, International Application No. PCT/US2007/011044.

(Continued)

*Primary Examiner*—Scott J Sugarman
*Assistant Examiner*—Vipin M Patel
(74) *Attorney, Agent, or Firm*—Blakely Sokoloff Taylor & Zafman LLP

(57) ABSTRACT

The dilemma encountered in most projection systems of having the etendue of the LED-based light source used often being much larger than the etendue of the imager used, causes such systems to have poor throughput efficiency. The etendue folding illumination systems of this invention being comprised of at least one folded collimator/concentrator having coupled into its input aperture an LED-based light source and having an output aperture characteristics that match the target etendue, overcome this dilemma by folding the light source etendue to match the target etendue of the projection system imager while efficiently conserving the flux generated by the light source.

47 Claims, 15 Drawing Sheets

U.S. PATENT DOCUMENTS

| | | |
|---|---|---|
| 2002/0114157 A1 | 8/2002 | Chuang et al. |
| 2005/0036119 A1* | 2/2005 | Ruda et al. .................... 353/99 |
| 2005/0051787 A1 | 3/2005 | Erchak et al. |
| 2005/0088758 A1 | 4/2005 | Minano et al. |
| 2005/0094401 A1 | 5/2005 | Magarill |
| 2005/0129358 A1 | 6/2005 | Minano et al. |
| 2005/0243570 A1 | 11/2005 | Chaves et al. |

FOREIGN PATENT DOCUMENTS

| | | |
|---|---|---|
| WO | WO-2004/112443 A1 | 12/2004 |

OTHER PUBLICATIONS

Roland Winston et al., "Nonimaging Optics", 2005, pp. 50-99, Elsevier Academic Press, Burlington, MA.

Waqidi Falicoff et al., "PC-LED Luminance Enhancement due to Phosphor Scattering", Aug. 22, 2005, Proceedings of SPIE, vol. 5942.

Bill Parkyn et al., "Remote phosphor with recycling blue-pass mirror", Sep. 8, 2005, Proceedings of SPIE, vol. 5942.

* cited by examiner

US 7,889,430 B2

LED-BASED HIGH EFFICIENCY ILLUMINATION SYSTEMS FOR USE IN PROJECTION SYSTEMS

CROSS-REFERENCE TO RELATED APPLICATION

This application claims the benefit of U.S. Provisional Patent Application No. 60/799,164 filed May 9, 2006.

BACKGROUND OF THE INVENTION

1. Field of the Invention

The present invention relates to methods, apparatus, and systems to build LED-based high efficiency illumination systems for use in projection systems.

2. Prior Art

The advent of digital high definition (HD) video technology is causing a phenomenal demand for HD televisions (HDTV) and HD display devices with large screen sizes having high brightness characteristics. Several display technologies are poised to address this demand; including Plasma Display Panel (PDP), Liquid Crystal Display (LCD), and Rear Projection Display (RPD) devices that use micro-display imagers such as a digital micro-mirror device (DMD) or a liquid crystal on silicon (LCOS) device. The cost and brightness performance of the latter display technology is highly dependent on the efficiency of the illumination system it uses. The designers of such display systems are constantly in search of a more cost effective, efficient illumination systems that would offer high brightness. Recent advances in high brightness light source technologies, such as Light Emitting Diode (LED) devices, make these light sources a good candidate for use in RPD systems. However, the light emission characteristics of these light sources are typically Lambertian or near Lambertian making it difficult to achieve adequate illumination efficiency when using such light sources in RPD systems that typically uses small size micro-display imagers. By Lambertian, we mean that the distribution of the light emitted by the source has the same brightness or luminance when viewed from any angle.

For the purpose of this background discussion, the following terminology will be used for quantitative analysis of the illumination systems performance:

Luminous flux ($\Phi$) given by energy/time (lumen) emitted from a light source or an aperture of a given area (S) into a solid angle (Q).

Luminous intensity (I) is the distribution of flux per unit solid angle (lumen/steradian).

Luminance (B), being the physical measure of brightness, is the light intensity when spread over a given area–defined as B=Luminous Intensity/Surface area of the light source or aperture (lumen/steradian $m^2$).

Geometric extent or "etendue" (G) is the integral of the area S of the emitting surface or aperture over the solid angle Q into which light propagates—defined as:

$$G = \pi n^2 S \sin^2 \Omega, \quad (1)$$

where $\Omega$ is half the angle subtended by the area S and n is the index of refraction of the media in which the light is propagating. Luminous flux can be expressed as the luminance times the etendue:

$$\Phi = BG \quad (2)$$

FIG. 1 illustrates a typical configuration of a micro-display based rear projection display system 100, comprised of a light source 110 having an emitting surface of S, an illumination system 120, a micro-display imager 130, having a reflective area S', and a set of projection optics 140. In FIG. 1, the function of collecting as much light as possible from the light source 110 and of deflecting it into the micro-display imager 130, covering specified angles of acceptance at the micro-display imager 130, is carried out by the illumination system 120. As illustrated in FIG. 1, the light emitted from the light source 110 and collected by the illumination system 120 subtends a half angle $\Omega$ and the micro-display imager 130 requires illumination over a subtended half of value $\Omega'$. In FIG. 1, the illumination system 120 would be able to achieve the greatest efficiency if it is able to collect a maximum amount of the light emitted by the light source and direct a maximum amount of the light it collects toward the micro-display imager 130—a goal that would be achieved if etendue is conserved; meaning:

$$n^2 S \sin^2 \Omega = n'^2 S' \sin^2 \Omega' \quad (3)$$

Where n is the index of refraction of the coupling between the illumination system 120 input aperture and the light source 110, and n' is the index of refraction of the coupling between the illumination system 120 output aperture and the micro-display imager 130. Unfortunately, such a goal is difficult to achieve in micro-display based projection systems such as 100 that use Lambertian or near Lambertian light sources 110, such as Light Emitting Diode (LED) devices, typically having etendue substantially larger than the etendue of the micro-display imager 130. In such systems, the etendue of the light source could be five to ten times larger than the etendue of the micro-display imager, which causes the efficiency of illumination system, and subsequently the efficiency of the entire projection system, to be quite poor. In prior art illumination systems, it is not possible to decrease the etendue without lose of light flux in proportion with the ratio of the reduced etendue to the original etendue.

Referring to FIG. 1, when the light source 110 used in the illumination system 120 is an LED device, the coupling of the LED device onto the input aperture of the illumination system 120 would typically be accomplished using one of two techniques; namely, air gap coupling or index matched coupling. In air gap coupling, a thin air gap in maintained between the light emitting surface of the LED device 110 and the input aperture of the illumination system 120. In index matched coupling, the light emitting surface of the LED device 110 is coupled onto the input aperture of the illumination system 120 using a coupling gel having an index of refraction that equals that of the acrylic window on top of the LED device (see the following discussion which gives a brief overview of the typical structure of an LED device). In assuming the Lambertian characteristics of light emitted by a typical LED device coupled onto the input aperture of the illumination system 120, FIG. 2 is a plot the illumination system 120 output/input surface area expansion S'/S (vertical axis 210) as a function of the collimation angle $\Omega'$ (horizontal axis 220) required to be achieved at the output aperture of the illumination system 120 when the illumination system 120 attains maximum efficiency by achieving the etendue conservation condition expressed in equation (3). In FIG. 2, the curve 230 assumes air gap coupling, the curve 240 assumes index matched coupling and the vertical dashed line 250 shows the output/input surface area expansion S'/S when the required collimation angle is 12°, which is the collimation angle required by commercially available micro mirror imagers.

As shown in FIG. 2, in order to achieve 12° collimation angle, the collimation area at the output aperture of the illumination system 120 would be 23 times larger than the emitting surface of the LED device when air gap coupling is used and would be 52 times larger when than the emitting surface of the LED device when the index matched coupling is used. The increase in the illumination system 120 output/input surface area expansion S'/S when index matched coupling is attributed to the increase of the illumination input etendue by a factor that equals to $n^2$ (a factor of 2.25 when n=1.5).

When taking into account that currently commercially available LED devices can generate in the order of 50 lumen of flux per square millimeter ($mm^2$) and in assuming that at least 1,000 lumens are required to be generated by the LED device, the emitting surface area of the LED would be approximately 20 $mm^2$. It follows from FIG. 2 that in order to achieve the collimation angle of 12° required by the typical micro mirror imager, the collimation area at the output of the illumination system 120 would be 460 $mm^2$ when air gap coupling is used and 1,350 $mm^2$ when index matched coupling is used. In further taking in account that currently commercially available micro mirror imagers, such as the DLP imager from Texas Instruments, has a 13.68-micron pixel pitch, the typical imager surface area for a projection system having an SVGA or 720 p resolution that uses such imager type would be approximately 90 $mm^2$ and 172 $mm^2$, respectively. It follows that for a projection system such as a typical 720 p resolution micro mirror imager, the maximum efficiency that the illumination system 120 can achieve would be 19.5% and 8.7% when either air gap or index matched coupling is used; respectively. For a projection system that uses an SVGA resolution micro mirror imager, the maximum efficiency that the illumination system 120 can achieve would be 37.5% and 16.6% when either air gap or index matched coupling is used; respectively. As demonstrated by this example, the typically larger etendue of the LED light source in comparison with a typical projection system imager etendue would cause an LED-based illumination system 120 to have poor flux efficiency. As will be explained in the detailed description section of this patent application, the illumination system of this invention would be able to achieve a much higher illumination efficiency by using light recycling means to fold the etendue at the output of the illumination system to make it match the projection system imager etendue in both area as well as aspect ratio.

U.S. Pat. No. 6,144,536 shows an illumination system that enhances the luminance of a light source having a reflective emitting surface by recycling a portion of the light emitted by a light source. U.S. Pat. Nos. 6,869,206 and 6,960,872 apply the notion of light recycling, which was described in U.S. Pat. No. 6,144,536, to demonstrate an illumination system comprised of a light-reflective cavity, enclosing at least one light emitting diode (LED) having a reflective surface, and having at least one output aperture. U.S. Pat. Nos. 6,144,536, 6,144,536 and 6,960,872 aim at the luminance enhancing aspects of the illumination system that use a light source having a reflective emitting surface. Furthermore, although U.S. Pat. Nos. 6,869,206 and 6,960,872 mention the placement of light collimating optical elements at the output aperture of the light-reflective cavity, they do not address the efficiency of the overall illumination system (being comprised of the light-reflective cavity and the light collimating optical elements) in terms of the overall illumination system's ability to match a specified output etendue while achieving high efficiency. In fact it can be shown that the characteristics of the light at the output aperture of the light-reflective cavity described in U.S. Pat. Nos. 6,869,206 and 6,960,872 would always be Lambertian, thus making the efficiency of overall illumination system be substantially limited by the efficiency the collimation optics placed at the output aperture of the light-reflective cavity described in U.S. Pat. Nos. 6,689,206 and 6,960,872.

Furthermore, the etendue achieved at the output aperture of the illumination system would be highly dependent on the desired luminance gain to be achieved, thus making it difficult, if not impossible, to simultaneously match the desired target etendue.

As will be explained in the detailed description section, the efficiency improvement of the illumination system of this invention is made possible through the recycling of the light. The benefits of recycling the light are recognized in the prior art (see U.S. Pat. Nos. 6,144,536, 6,144,536, 6,960,872 and 6,962,426, "PC-LED Luminance Enhancement due to Phosphor Conversion", W. Falicoff et al, Proceedings of SPIE, Vol. 5942, Aug. 22, 2005, and "Remote Phosphor with Recycling Blue-pass Mirror", B. Parklyn et al., Proceedings of SPIE, Vol. 5942, Sep. 8, 2005).

In U.S. Pat. Nos. 6,144,536, 6,144,536 and 6,960,872 the light generated by an LED device is recycled through reflection off the LED device reflective surface and the interior reflective wall of a cavity encompassing the LED device(s). The light emerging out of an output aperture of the reflective cavity encompassing the LED device(s) would have higher luminance than the intrinsic luminance of the LED device(s) coupled into the reflective cavity when the reflectivity of the cavity inner walls is sufficiently high and the area of the output aperture is sufficiently smaller than the light emitting surface area of the LED device(s). In taking into account the principal of conservation of flux, the luminance gain claimed, it is indicated, although not mentioned or explained, that the apparatus would have an etendue at its output aperture that is smaller than the etendue of the LED devices coupled into its reflective cavity. However, the etendue at the output aperture of the apparatus described would still exhibit the Lambertian characteristics of the LED light source, and as indicated, would have to be collimated and made to match the target etendue area and aspect ratio of the projection system by additional means beyond the reflective cavity into which the LED devices(s) are coupled.

U.S. Pat. No. 6,962,426 claims to achieve increased brightness of the projection system by recycling some of the unused light emitted by the primary light source, being in this case a high pressure arc lamp, and reflecting it by a spatially non-uniform light filter back into the lamp assembly housing the lamp source. In so doing, the unused portion of the light are re-reflected for transmission through a different spatial region of the light filter, resulting in an approximately 30% increase in coupling the light generated by the light source into the projection system. However, because recycling of unused light occurs within the lamp assembly, there is no significant reduction in etendue.

"PC-LED Luminance Enhancement due to Phosphor Conversion" (W. Falicoff et al, Proceedings of SPIE, Vol. 5942, Aug. 22, 2005) describes a technique for increasing the luminance of Phosphor Conversion LED (PC-LED) through recycling of the phosphor back-scattered light by reflecting it off the Gallium Nitride (GaN) material of the LED and its back-reflector substrate. "Remote Phosphor with Recycling Blue-pass Mirror" (B. Parklyn et al., Proceedings of SPIE, Vol. 5942, Sep. 8, 2005) describes what is referred to in the reference as a Remote Phosphor System that uses optical means to transfer the flux generated by an LED device to a remote phosphor of the same size. The optical means described in "PC-LED Luminance Enhancement due to Phosphor Conversion" comprises a collimator that collects the light generated by the LED device, a concentrator that focuses the light onto the remote phosphor coupled into its output aperture and a band-pass dichroic filter placed in between the collimator/concentrator pair. The band-pass dichroic filter recycles the back-scattered light from the remote phosphor resulting in an increase in the forward emission luminance from the remote phosphor. Although not explained in either "PC-LED Luminance Enhancement due to Phosphor Conversion" or "Remote Phosphor with Recycling Blue-pass Mirror", the luminance gain achieved by the techniques described in these references is attributed to the "folding" of the phosphor forward and backward isotropic emissions into a combined forward Lambertian emission. In effect the techniques described decrease the etendue of the phosphor, and in applying the principal of conservation of luminous flux, this decrease in etendue would result in a corresponding increase in the forward emission luminance of the phosphor.

U.S. Pat. Nos. 5,757,557, 6,547,423, 6,896,381 and 6,639,733 and U.S. Patent Application Publication Nos. 2005/0243570 A1, 005/0088758 A1 and 2005/0129358 A1 describe several techniques for the design of illumination systems that use LED devices as a light source. All of these illumination systems are limited in the efficiency they can achieve by the principal of conservation of etendue based on which the etendue at the input and output apertures of the illumination system must be substantially equal in order to achieve the highest possible efficiency—a condition which is seldom encountered in projection systems especially those targeting the use of LED devices as a light source whereby the light source etendue is substantially larger than the imager etendue, which lead to making the illumination systems unable to achieve an efficiency beyond the ratio of the imager etendue to the source etendue.

Recycling of light is also commonly used within the inner structure of the LED die itself in order to improve its overall efficiency. There are two principal approaches for improving LED efficiency: the first is increasing the internal quantum efficiency, which is determined by crystal quality and epitaxial layer structure, and the second is increasing the light extraction efficiency. High values of internal quantum efficiency have already been accomplished, and so further improvement may not be readily achievable. However, there is much room for improvement of the light extraction efficiency. Considering the refractive indices of GaN (n≈2.5) and air, the critical angle for the light escape cone is about 23°. The light outside the escape cone is reflected by total internal reflection (TIR) back into the substrate and is repeatedly reflected within the LED device inner structure, then absorbed by active layers or electrodes, causing a substantial reduction in the luminous flux emitted from the LED device surface. In order to improve the LED device extraction efficiency, the GaN structure of the LED device is often placed between an acrylic window on top with n=1.5 and a reflective substrate on the bottom having a typical reflectance greater than 90%. The placement of the acrylic window on top of the GaN structure increases the critical angle for the light escape cone to about 36°, thus allowing more light to be extracted from the active GaN layer of the LED. Furthermore, the placement of the reflective substrate allows the TIR light to be recycled with a possible second chance of being extracted, thus further improving the extraction efficiency. A consequence of this "intra-die" recycling type of extraction efficiency improvement technique is that the surface of the LED device becomes reflective. This resultant reflectivity of the LED device surface will be utilized in conjunction with other aspects of this invention, as explained in the detailed description section of this patent application, to recycle the light and fold the etendue at the output aperture of the illumination system to make it match the etendue of the imager used in the projection system, thus enabling the illumination system to achieve a substantially higher efficiency.

In order to achieve further improvement in the extraction efficiency, in lieu of maintaining a narrow air gap between the LED device and the input aperture of the illumination system, the LED device is often coupled onto the input aperture of the illumination system using an index matching gel having an index of refraction that matches that of the acrylic window of the LED device. Such an index matched coupling technique results in a substantial reduction in the fraction of light trapped within the LED device structure due to TIR, which would result in a subsequent increase in the extraction efficiency. In comparison with air gap coupling, index matched coupling of the LED device onto the input aperture of the illumination system can result in approximately 50% (meaning a factor of 1.5 of increase) in the flux extracted from the LED device. Unfortunately, however, this improvement in the extraction efficiency cannot be harnessed in the prior art because even though the generated flux is increased by a factor of 1.5, the etendue at the input aperture of the illumination system increases by a disproportional factor of $n^2=2.25$, thus causing a net reduction in the illumination system efficiency (see FIG. 2). As will be explained in the detailed description section of this patent application, the illumination system of this invention uses light recycling means to fold the etendue at the output aperture of the illumination system to make it match the etendue of the imager used in the projection system, thus making it possible to efficiently take advantage of the improvement in extraction efficiency that results from index matched coupling of the LED device onto the input aperture of the illumination system.

U.S. Patent Application Publication No. 2005/0051787 A1 describes a technique that uses a photonic lattice to improve the extraction efficiency of LED devices. In this publication, a metal layer having a triangular pattern of openings (a photonic lattice) is placed on the top of the LED die structure. Placement of the photonic lattice on the top surface of the LED die causes its top surface to have a dielectric function that varies spatially according to the selected parameters of the photonic lattice. The parameters of the photonic lattice include the depth of the openings, the diameter of the openings and the spacing of the openings. The triangular top surface pattern described is detuned from an ideal pattern of uniform spacing such that the center-to-center distance between the photonic lattice openings is randomly varied by a small fraction. The detuning of the triangular pattern of the LED device top layer causes an improvement of the LED device extraction efficiency. An added effect of the placement of the photonic lattice on top of the LED device is that the surface of the LED device becomes highly reflective. This resultant reflectivity of the LED device surface will be utilized in conjunction with other aspects of this invention, as explained in the detailed description section of this patent application, to recycle the light and fold the etendue at the output aperture of the illumination system to make it match the etendue of the imager used in the projection system, thus enabling the illumination system to achieve a substantially higher efficiency.

The objective of this invention is, therefore, to demonstrate an apparatus and a method for illumination system that uses Lambertian or near Lambertian LED light source having an etendue that is larger than the projection system imager etendue that can achieve high overall efficiency in illuminating and matching the smaller etendue of the micro-display imager used in projection systems. Achieving such an objective would have a substantial commercial value as it would result in an increase in the LED-based projection systems efficiency, which would in turn result in a reduction in the overall projection system cost.

Additional objectives and advantages of this invention will become apparent from the following detailed description of the preferred embodiments thereof that proceeds with reference to the accompanying drawings.

DETAILED DESCRIPTION OF THE PREFERRED EMBODIMENTS

References in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

High efficiency illumination systems for use in projection systems are described herein. In the following description, for the purpose of explanation, numerous specific details are set forth in order to provide a thorough understanding of the invention. It will be apparent, however, to one skilled in the art that the invention can be practiced with different specific details. In other instances, structures and devices are shown in block diagram form in order to avoid obscuring the invention.

Figure 1:
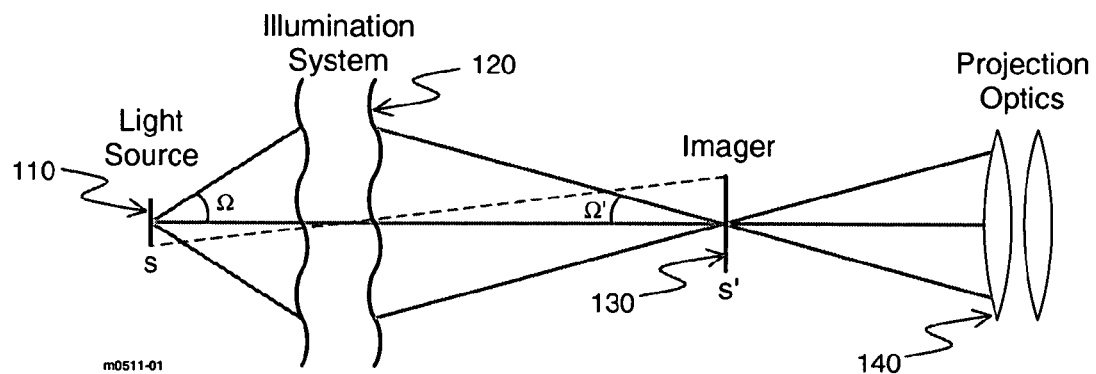
FIG. 1 illustrates a prior art rear illumination system used in projection systems.
Figure 2:
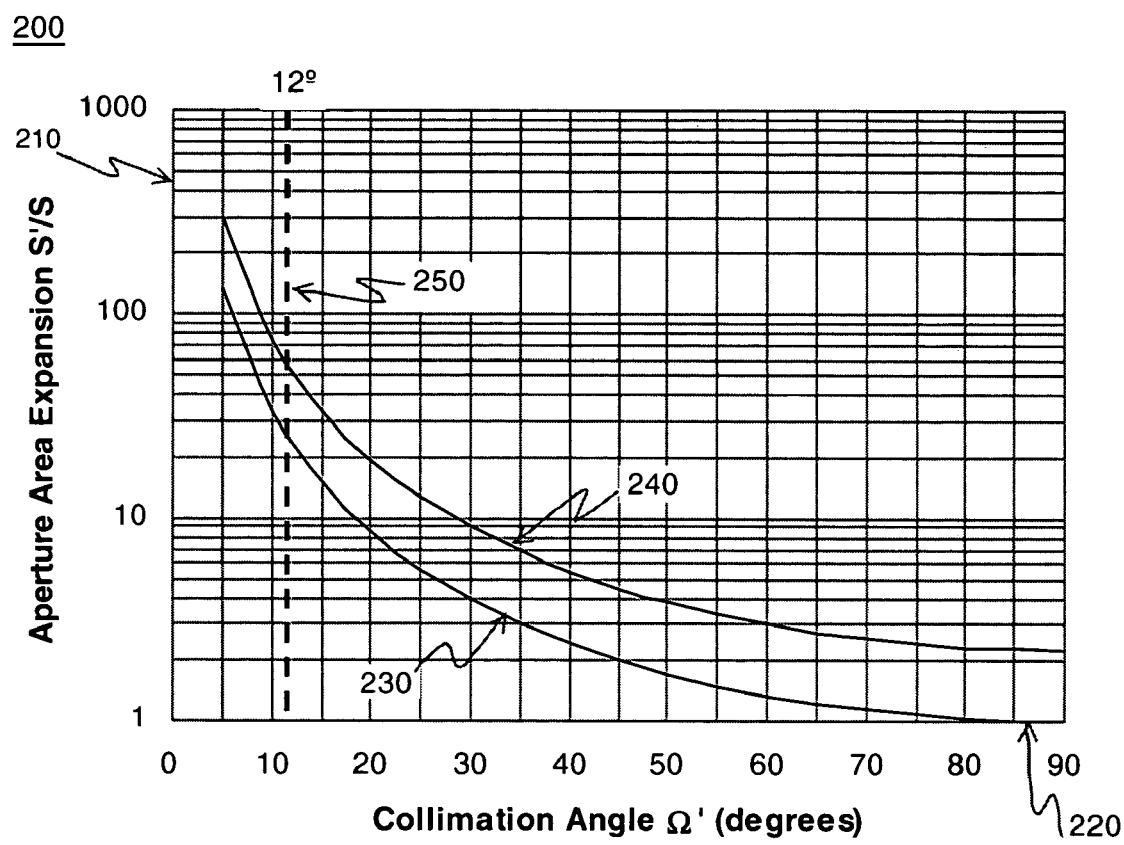
FIG. 2 illustrates the condition for achieving maximum efficiency for prior art illumination systems that use LED light source.
Figure 3A:
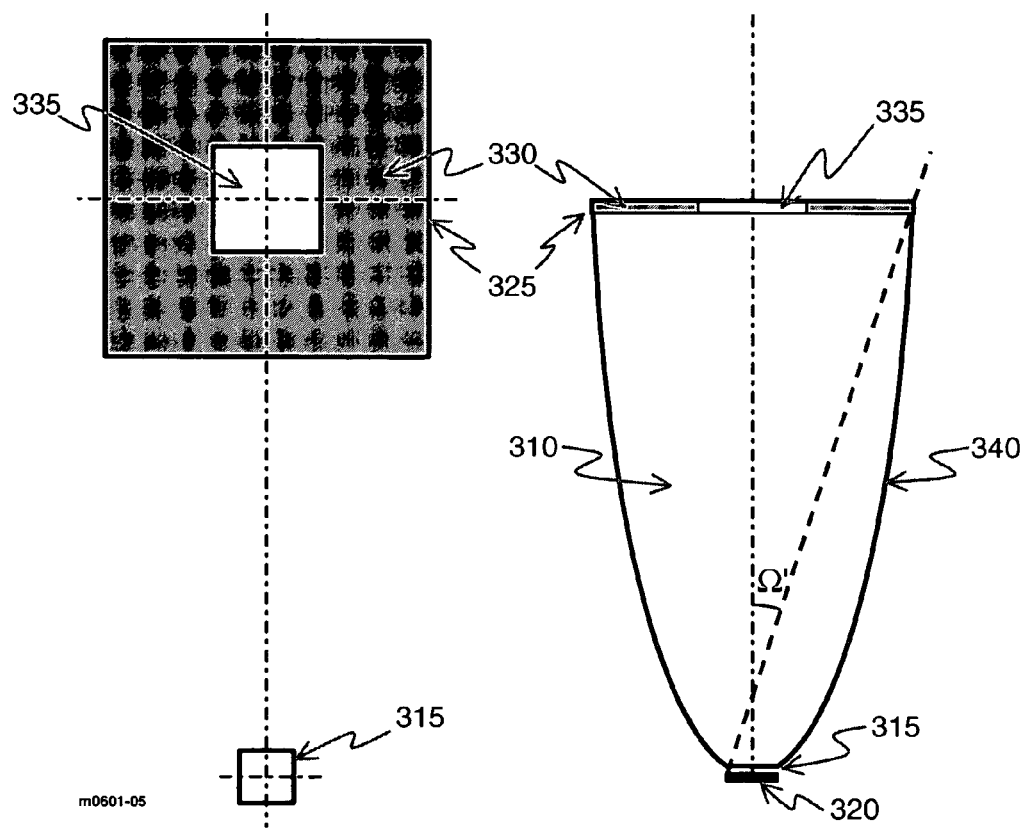
FIG. 3A illustrates cross-sectional views of the first embodiment of the illumination system of this invention.

The high efficiency illumination system described herein, referred to as "Etendue Folding Illumination System", is illustrated in FIG. 3A. It should be appreciated that the drawings of FIG. 3 is merely a representation of the basic structure of the Etendue Folding Illumination System of this invention whose purpose is to facilitate explaining the operation and performance characteristics of the Etendue Folding Illumination System of this invention. FIG. 3A illustrates cross-sectional view of one embodiment of the Etendue Folding Illumination System 300 of this invention. As illustrated in FIG. 3A, the Etendue Folding Illumination System 300 is comprised of at least one hollow or solid dielectric reflector 310 having reciprocal input/output characteristics and having coupled into its input aperture 315 a light source 320 which is comprised of multiple Light Emitting Diode (LED) dies of multiple colors, and having coupled into its output aperture 325 a reflective aperture stop 330 having a clear aperture 335 whose collimation angle, area and aspect ratio match the corresponding parameters of a target etendue (typically the target etendue would be that of the micro-display imager used in the projection system).

In FIG. 3A the reflector 310 can be a Compound Parabolic Concentrator (CPC), a Compound Hyperbolic Concentrator (CHC), Compound Elliptical Concentrator (CEC) or a Tapered Light Pipe (TLP). By appropriately selecting their design parameters, these types of reflectors can collimate the light generated by the LED light source 320 coupled into their input aperture 315 to any desired collimation angle. The cross sectional view illustrated in FIG. 3A shows the typical parabolic profile of a CPC. Hereinafter, a CPC will be used for demonstrating the design aspects and characteristics of the Etendue Folding Illumination System of this invention. A person skilled in the art will readily know how to substitute the use of a CPC with another type of reflector.

Figure 3B:
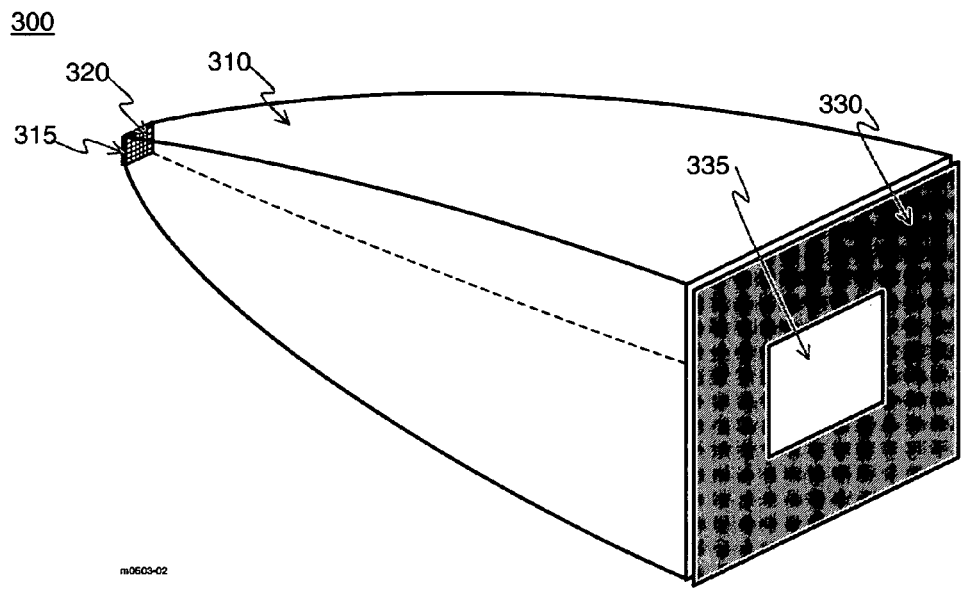
FIG. 3B illustrates an isometric view of the first embodiment of the illumination system of this invention having a square cross section.
Figure 3C:
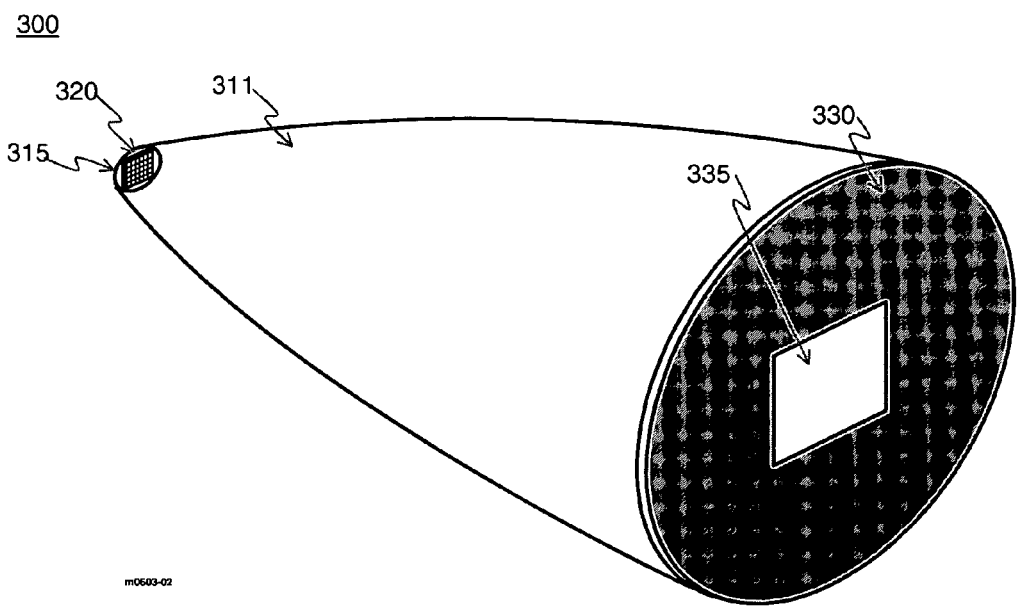
FIG. 3C illustrates an isometric view of the first embodiment of the illumination system of this invention having a circular cross section.

As illustrated in FIG. 3A, the vertical cross section of the reflector 310 would have a compound parabolic profile (see "Nonimaging Optics", Chapter 4 and 5, pp 50-99, R. Winston et al, Elsevier Academic Press, 2005). Depending on the desired angular characteristics of the collimation cone at the output aperture 325, the horizontal cross section of the reflector 310 can be circular, square or rectangular shaped. However, in order to maximize the efficiency of the coupling between the LED light source 320 and the input aperture 315, the horizontal cross section of the reflector 310 is typically designed to match the area and aspect ratio of the emitting surface of the LED light source 320. FIGS. 3B and 3C illustrate the Etendue Folding Illumination System of this invention being implemented using a square cross section CPC reflector 310 and a circular cross section CPC reflector 311, respectively. In both of the these implementations of the Etendue Folding Illumination System of this invention the reflectors 310 and 311 would be designed to achieve the collimation angle $\Omega'$ required by the projection system imager, for example the 12° collimation angle required by the typical micro mirror imager. In referring to FIGS. 3B and 3C, it follows from equation (3) that in conserving etendue, the sides dimension of the reflector 310 or the diameter of the reflector 311 at the output aperture 325 would be given by:

$$a' = a/\sin \Omega', \qquad (4)$$

where "a" designates the sides dimension of the reflector 310 or the diameter of the reflector 311 at the input aperture 315. The collimation length $L_C$ of the reflectors 310 or 311 would be given by:

$$L_C = (a+a')/2 \tan \Omega' \quad (5)$$

As indicated by equations (4) and (5) above, the sides dimension or diameter of the output aperture 325 and the overall length of the reflectors 310 or 311 are inversely proportional with the desired value of the collimation angle $\Omega'$. Both the square cross section reflector 310 and the circular cross section reflector 311 designs illustrated in FIG. 3B and FIG. 3C, can collimate the light generated by the LED light source 320 into a collimation cone having substantially the desired collimation angle $\Omega'$. However, the coupling of a typical LED light source 320 having a square light emitting surface area would attain a more efficient utilization of the square input aperture 315 of the square cross section reflector 310 of FIG. 3C, hence will be able to achieve a more efficient coupling of the flux generated by the LED light source 320 into the input aperture 315 in addition to being able to achieve a higher level of light uniformity across the output aperture 325. Otherwise, the design characteristics of a square cross section reflector 310 of FIG. 3B and the circular cross section reflector 311 of FIG. 3C are substantially similar and would be known to a person skilled in the art.

Figure 4:
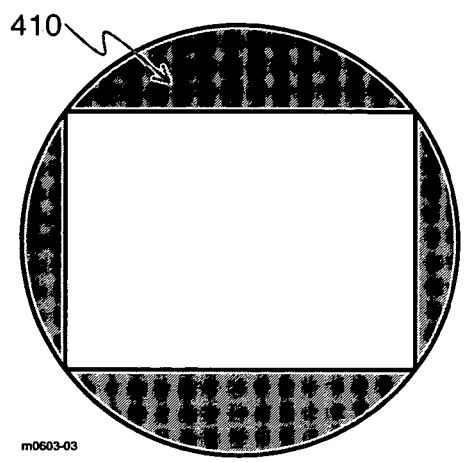
FIG. 4 illustrates the efficiency degradations due to vignetting in matching the projection system aspect ratio.
Figure 4:
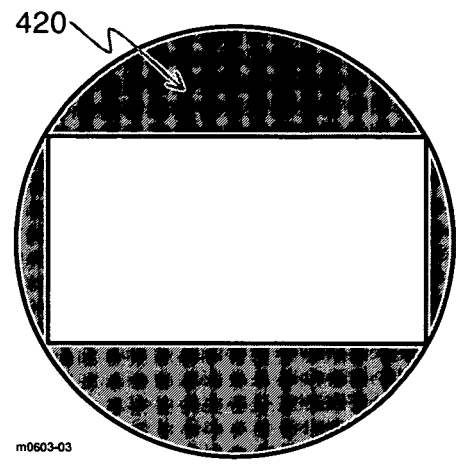
Figure 4:
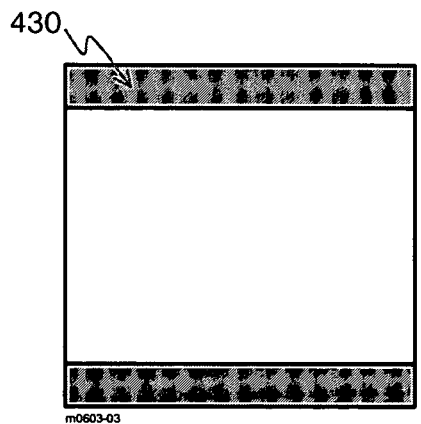
Figure 4:
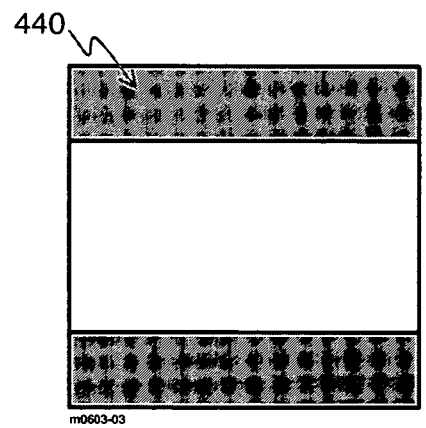

In order to appreciate the efficiency advantages offered by the Etendue Folding Illumination System 300 of this invention it would be beneficial to first briefly discuss the efficiency limitations of the type of reflector 310 or 311 as a stand-alone illuminator. As explained in the background section, the fundamental limitation in using of the type of reflectors 310 or 311 as a stand-alone illuminator in projection systems is that in order to provide the luminous flux required by the projection system, the typical etendue of the LED light source would be significantly larger than that of the imager used in the projection system, as a result the efficiency that can be achieved by an LED-based illumination system used in projection systems would be poor. Another limitation in using the type of reflector 310 or 311 as a stand-alone illuminator in projection systems arises from the aspect ratios of the typical imagers used in projection systems, which typically are rectangular shaped with either 4:3 or 16:9 aspect ratios. Matching of the projection system imager aspect ratio with the type of reflector 310 or 311 as a stand-alone illuminator would cause another type of efficiency degradation known as "vignetting". FIG. 4 illustrates the efficiency degradation due to vignetting when circular cross section reflector 311 and when square cross section reflector 310 are used to generate the illumination patch for projection system imagers with 4:3 and 16:9 aspect ratios. Referring to FIG. 4, the crosshatched area 410 represents the vignetting when a circular cross section reflector 311 is used to generate a 4:3 aspect ratio illumination patch, the crosshatched area 420 represents the vignetting when the a circular cross section reflector 311 is used to generate a 16:9 aspect ratio illumination patch, the crosshatched area 430 represents the vignetting when the a square cross section reflector 310 is used to generate a 4:3 aspect ratio illumination patch and the crosshatched area 440 represents the vignetting when the a square cross section reflector 310 is used to generate a 16:9 aspect ratio illumination patch. As illustrated in FIG. 4, aside from the efficiency degradation due to source-to-imager etendue mismatch, the aspect ratio mismatch would limit the efficiency that can be achieved by the reflectors 310 and 311 as stand-alone illuminators to the values outlined in Table 1 below.

TABLE 1

Efficiency limitations due to aspect ratio mismatch

| | Imager 130 Aspect Ratio | |
|---|---|---|
| | 4:3 | 16:9 |
| Circular Cross Section Reflector 311 | 0.61 | 0.14 |
| Square Cross section Reflector 310 | 0.75 | 0.83 |

It is possible to achieve some efficiency improvements by making the cross section of the reflector 310 having a rectangular shape that matches the imager 130 aspect ratio. In addition to substantially increasing the difficulty in designing the reflector 310, that would also cause the input aperture 315 to become rectangular, which would result in some efficiency degradation due to the mismatch between a rectangular input aperture 315 and the typically square aspect ratio of the LED light source 320. The overall efficiency of the reflector 310 as a stand-alone illuminator is therefore highly dependent on achieving the proper balance between matching the aspect ratio of its input aperture 315 to the aspect ratio of the light source 320 versus matching the aspect ratio of its output aperture 325 to the aspect ratio of the imager 130. Such a tight coupling between the aspect ratios of the light source 320, the cross section of the reflector 310 and the imager 130 would typically prevent the reflector 310 as a stand-alone illuminator from attaining the highest possible efficiency.

Another limitation in using of the type of reflector 310 or 311 as a stand-alone illuminator in projection systems is the uniformity (meaning the spatial distribution of flux, referred to as "irradiance") it can achieve across its output aperture 325. In typical projection systems 100, maximum to minimum irradiance variation of 10% to 15% is required across the imager 130 aperture. Although a reflector 310 or 311 that is designed to achieve a collimation angle in the order required by typical projection systems 100, for example the 12° collimation angle required by a typical projection system that use micro-mirror imagers, would have a sufficient length that would enable it to achieve sufficient uniformity, when such a reflectors are used in a color sequential type projection system and having coupled into their input aperture 315 a LED light source 320 which is comprised of multiple LED dies of multiple colors, the uniformity that can achieve for each color would tend to degrade below the acceptable limits stated. In order to overcome this limitation the length of the reflector 310 or 311 are typically extended with vertical walls, which act as a homogenizing length, designated $L_H$, which would improve the uniformity at their output aperture to within the required values. The overall length of the reflector 310 including the homogenizing length will then become $(L_C+L_H)$. In order to achieve the level of uniformity typically required in projection systems, the homogenizing length $L_H$ should be sufficient for the collimated light to reflect two to three times against the extended vertical walls. Accordingly, the homogenizing length $L_H$ can be expressed in terms of the output aperture 325 diameter a' and the collimation angle $\Omega'$ as:

$$L_H = Ka'/\tan \Omega'; \text{ where } K=1, 2$$

From the above expression, it follows that f the homogenizing length $L_H$ can be expressed in terms of the collimation length $L_C$ as:

$$L_H = Ka'L_C/(a+a'); \text{ where } K=1, 2$$

From the above expression, in order to achieve the level of uniformity typically required in projection systems, the overall length of the illumination system ($L_C+L_H$) would need to become at least twice the collimation length $L_C$, which would typically reduce the compactness of the illumination system and increase its cost.

Having outlined the limitations of using the type of reflector 310 or 311 as stand-alone illuminators in projection systems, the objective of the following discussion is to demonstrate the ability of the Etendue Folding Illumination System 300 of this invention to overcome these limitations. Referring to FIG. 3A, in utilizing the reciprocal input/output characteristics of the reflector 310, the placement of the reflective aperture stop 330 would have the effect of making the reflector 310 able to simultaneously act as a collimator in the forward direction and as a concentrator in the reverse direction. Meaning the light coupled onto the input aperture 315 of the reflector 310 would be collimated as it travels toward the output aperture 325, and in reverse the light reflected by the reflective aperture stop 330 would reenter the reflector 310 through its output aperture 325 and would be concentrated as it travels toward the input aperture 315. The reflector 310 acting as a concentrator would relay the portion of the light reflected by the reflective aperture stop 330 onto the exact etendue it had once emerged from, where it would be reflected by the reflective surface of the LED device 320 and coupled together with the light generated by the LED device 320 onto the input aperture 315 of the reflector 310. In the forward direction, the reflector 310, acting as a collimator, would collimate the combined light generated and reflected by the LED device 320 and coupled onto its input aperture 315 and relays it toward the output aperture 325. In effect, the light exiting the output aperture 325 of the reflector 310 would be a collimated combination of the light generated by the LED device 320 and the light reflected by the reflective aperture stop 330 and recycled back through the reflector 310.

The net effect of coupling the reflective aperture stop 330 onto the output aperture 325 of the reflector 310 is that the etendue associated with the reflective portion of the reflective aperture stop 330 would be folded back onto the reflector 310, thus leaving the much smaller etendue associate with the clear aperture 335 to become the exit (output) etendue of the illumination system 300 comprising the reflector 310, the LED device 320, and the reflective aperture stop 330. This would allow the much smaller etendue of the clear aperture 335 to be designed to efficiently match the projection system imager area, aspect ratio and other required characteristics. Furthermore, it would also decouple the aspect ratio characteristics of the clear aperture 335 from that of the input aperture 315 and the output aperture 325 of the reflector 310, thus allowing the clear aperture 335 to be designed to efficiently match the projection system imager while independently allowing the input aperture 315 and the output aperture 325, and hence the cross section of the reflector 310, to be designed to efficiently match the aspect ratio of the LED light source 320.

Because of the etendue folding achieved by coupling the reflective aperture 330 onto the output aperture 325 of the reflector 310, hereinafter the combination of the reflector 310 together with the reflective aperture stop 330 coupled onto its output aperture 325 would be referred to as the Folded Collimator/Concentrator 340. The intent of the following discussion is to substantiate the concept of operation of the Etendue Folding Illumination System 300 stated above.

Figure 5:
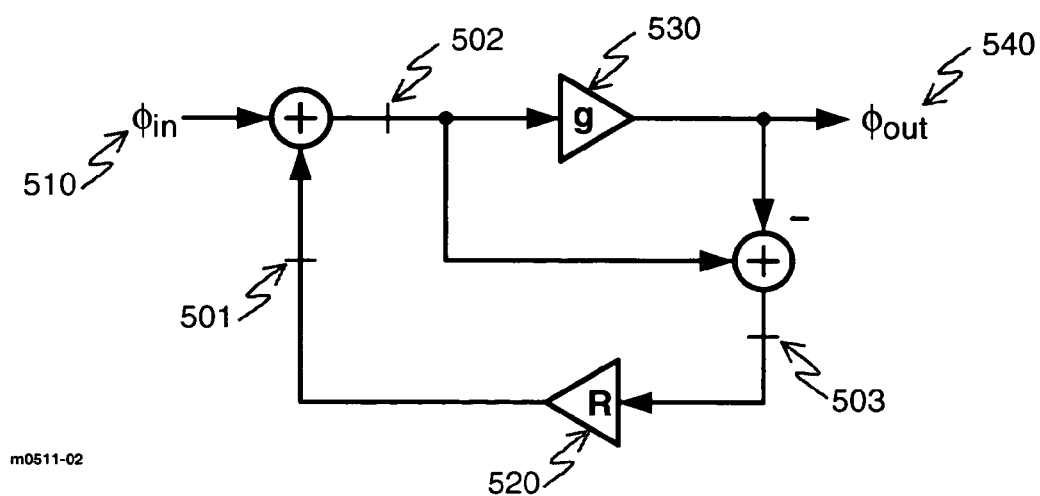
FIG. 5 illustrates a block diagram representation of the light recycling aspects of the illumination system of this invention.

FIG. 5 is a block diagram representation of the steady-state light flux recycling aspects of Etendue Folding Illumination System 300 of this invention. Referring to FIG. 5, the flux 510 generated by the LED device 320 and coupled onto the input aperture 315 of the Etendue Folding Illumination System 300 is designated $\Phi_{in}$ and flux 540 that exits the clear aperture 335 is designated $\Phi_{out}$. Meaning, $\Phi_{in}$ is the Etendue Folding Illumination System 300 input flux and $\Phi_{out}$ is its output flux. The flux 501 recycled by the reflective aperture stop 330, concentrated by the reflector 310 onto the input aperture 315, reflected by the LED device 320 and then coupled back onto the input aperture 315 is designated $\Phi_r$. As illustrated in FIG. 5, the total integrated flux 502 coupled onto the input aperture 315 can be expressed as:

$$\Phi_c = \Phi_{in} + \Phi_r \qquad (6)$$

Being coupled onto the input aperture 315 of the reflector 310, the total integrated flux $\Phi_c$ 502 would then be collimated by the reflector 310 in order to achieve the collimation angle required by the imager 130 of the projection system 100 when it reaches the output aperture 325 of the reflector 310. When the collimated light reaches the reflective aperture stop 330, a portion of it would exit the clear aperture 335 and the balance will be reflected by the reflective segment of the reflective aperture stop 330. In using the earlier designation of the area of the reflector 310 output aperture 325 as S', and in designating the area of the clear aperture 335 as $S_t$, the portion of the flux exiting the clear aperture 335 can be expressed as:

$$\Phi_{OUT} = \Phi_c(S_t/S')$$
$$= \Phi_c(\pi S_t \sin^2\Omega' / \pi S' \sin^2\Omega')$$

where $\Omega'$ denotes the collimation angle at the output aperture of the reflector 310, which is also the collimation angle required by the imager 130 used in the projection system 100.

In utilizing the principal of conservation of etendue from the input aperture 315 to the output aperture 325 of the reflector 310 expressed in equation (3), the above expression can be written as:

$$\Phi_{out} = \Phi_c(\pi S_t \sin^2\Omega'/\pi n^2 S \sin^2\Omega) = \Phi_c(G_t/G_s) \qquad (7)$$

where S denotes the surface area of the LED device 320 and $G_t$ denotes the target etendue required to be achieved by the Etendue Folding Illumination System 300 (being in this case the etendue of the imager 130 used in the projection system 100) and $G_s$ denotes the etendue of the LED device 320. The ratio ($G_t/G_s$) is known to persons skilled in art as the target-to-source etendue ratio (TSER), and is designated in FIG. 5 by the symbol "g", i.e., $$g \triangleq (G_t/G_s) \qquad (8)$$

By definition, the maximum value of TSER is unity, and in the cases of interest to this invention whereby the source etendue is much larger than the target etendue, the value of TSER is always much less than unity.

Before being re-coupled into the input aperture 315 of the reflector 310, the flux 503 reflected by the reflective portion of the reflective aperture stop 330 and coupled into the output aperture 325 of the reflector 310 would be equal to $(1-g)\Phi_c$ attenuated by the compounded reflectance of the reflective aperture stop 330, the reflective walls of the reflector 310 and the surface of the LED device 320. In FIG. 5 this compounded reflectance is designated by the symbol "R", which can be express as:

$$R = R_A R_W R_S$$

where $R_A$ denotes reflectance of the reflective aperture stop 330, $R_W$ denotes the reflectance of the walls of the reflector 310 and $R_S$ denotes the reflectance of the surface of the LED device 320. Typical values of the reflectance $R_A$ that can be achieved with commercially available reflective coating techniques would range from 0.9 to 0.98. When the reflector 310 is solid dielectric filled, the reflectance of its walls would typically be achieved by total internal reflection (TIR), which would make $R_W$ in this case equal to unity. In the case when the reflector 310 is a hollow reflector, typical values of $R_W$ that can be achieved with commercially available reflective coating techniques would range from 0.9 to 0.98. The typical values of $R_S$ can vary depending on the type of LED device 320, and the minimum value needed to have the Etendue Folding Illumination System 300 attain its design objectives will be discussed in a subsequent paragraph.

As illustrated in FIG. 5, the recycled flux $\Phi_r$ coupled onto the input aperture 315 of the reflector 310 can be expressed as:

$$\Phi_r = R(1-g)\Phi_c \tag{9}$$

From equation (6), (7) and (9) it follows that the output flux $\Phi_{out}$ of the Etendue Folding Illumination System 300 can be expressed in terms of the input flux $\Phi_{in}$ generated by the LED device 320 and coupled onto its input aperture 315 as:

$$\Phi_{out} = \Phi_{in} g / \{1 - R(1-g)\} \tag{10}$$

From the above expression the flux efficiency, designated by the symbol $\in$, of the Etendue Folding Illumination System 300 can be expressed:

$$\in \underline{\Delta} (\Phi_{out}/\Phi_{in}) = g/\{1-R(1-g)\} \tag{11}$$

From equations (2), (8) and (10) it follows that the output luminance $B_{out}$ at the clear aperture 335 of the Etendue Folding Illumination System 300 can be expressed in terms of the input luminance $B_{in}$ of the LED device 320 as:

$$B_{out} = B_{in}/\{1-R(1-g)\} \tag{12}$$

From the above expression the luminance gain, designated by the symbol $\lambda$, of the Etendue Folding Illumination System 300 can be expressed:

$$\lambda \underline{\Delta} (B_{out}/B_{in}) = 1/\{1-R(1-g)\} \tag{13}$$

Figure 6:
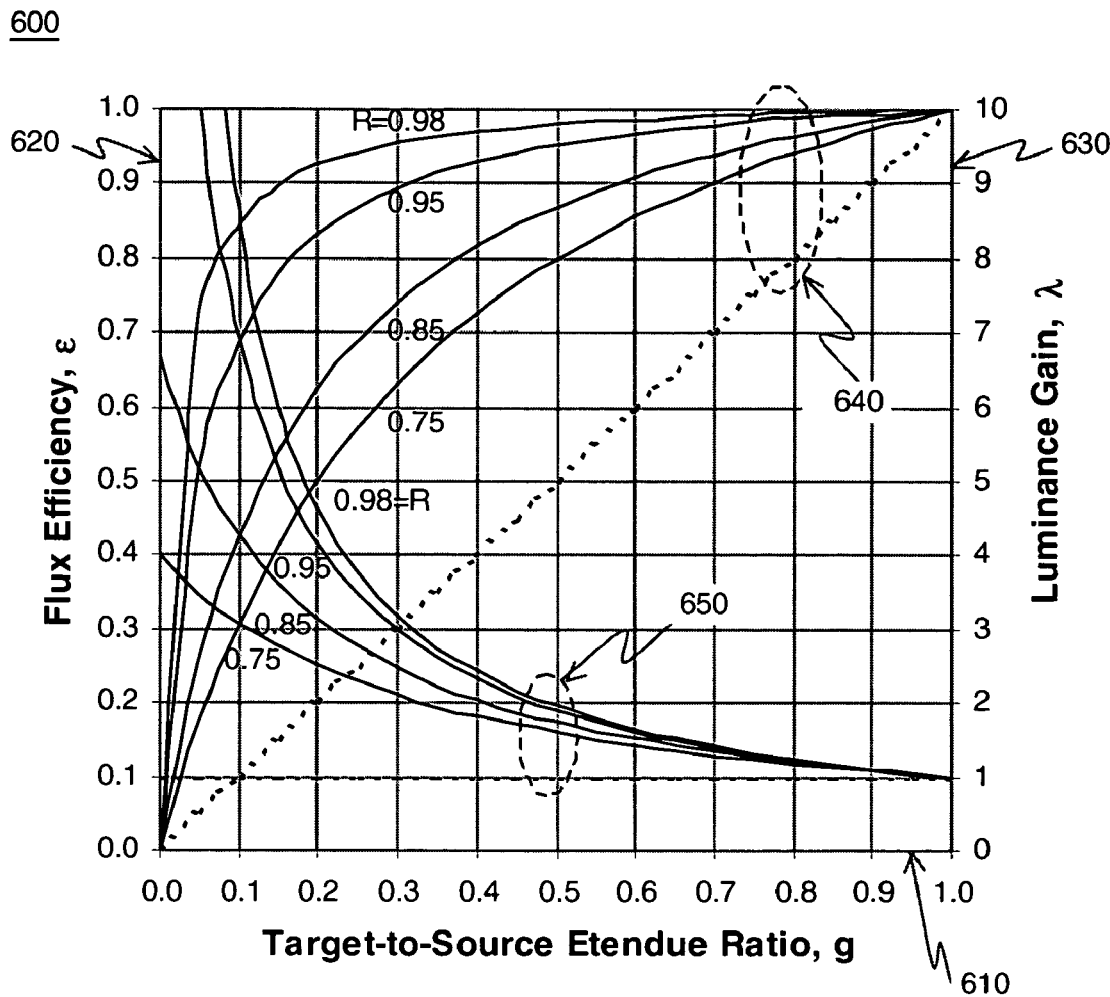
FIG. 6 illustrates the luminous flux efficiency and luminance gain characteristics of the of the illumination system of this invention.

Based on equations (11) and (13), the flux efficiency $\in$ and luminance gain $\lambda$ that can be achieved by the Etendue Folding Illumination System 300 are plotted in FIG. 6 as a function of the target-to-source etendue ratio "g" and for various values of the compound reflectance factor "R". Referring to FIG. 6, the horizontal axis 610 represents the range of values of the target-to-source etendue ratio "g", the left hand-side vertical axis 620 shows the values of flux efficiency $\in$ as given by equation (11) and the right hand-side vertical axis 630 shows the value of the luminance gain $\lambda$ as given by equation (13). The group of curves 640 shows the flux efficiency $\in$ given by equation (11) for various values of the compound reflectance factor "R" and the group of curves 650 shows the luminance gain given by equation (13) for various values of the compound reflectance factor "R".

Also plotted in FIG. 6 is the limiting case (dotted lines) when the reflectance factor R equals to zero, which would be the case when the aperture stop 330 is not reflective, meaning the case when the reflector 310 is used as a stand-alone illuminator in conjunction with a non-reflective aperture stop having a clear aperture that matches the target etendue, in which case the flux efficiency $\in$ equals the target-to-source etendue ratio "g". This limiting case is useful as a basis for comparing the flux efficiency of the Etendue Folding Illumination System 300 of this invention with the flux efficiency performance of a conventional Illumination System comprised of the reflector 310 stand-alone. Based on equation (11), the Etendue Folding Illumination System 300 flux efficiency improvement over the flux efficiency of a conventional Illumination System would be equal to the luminance gain $\lambda$ attained by the Etendue Folding Illumination System 300. As a consequence, FIG. 6 shows that the flux efficiency of the Etendue Folding Illumination System 300 of this invention would be substantially higher than that of a conventional illumination system that uses the same reflector 310 as a stand-alone illuminator. FIG. 6 also shows that the improvement in the flux efficiency of the Etendue Folding Illumination System 300 of this invention increases with the increase in the reflectance factor R.

From equation (11) and (13), the ratio of the flux efficiency that can be achieved by the Etendue Folding Illumination System 300 of this invention to the flux efficiency of a conventional illumination system comprised of the reflector 310 stand-alone would be equal to the luminance gain that can be achieved by the Etendue Folding Illumination System 300. It then follows that in order for the design of the Etendue Folding Illumination System 300 of this invention to achieve a flux efficiency improvement by a factor $\lambda_r$, the reflectance factor R must satisfy:

$$R \geq (\lambda_r - 1)/\lambda_r(1-g)$$

From which it follows that the reflectance $R_s$ of the surface of the LED device 320 must satisfy:

$$R_s \geq (\lambda_r - 1)/\{\lambda_r(1-g)R_A R_W\} \tag{14}$$

When the target-to-source etendue g=0.3 and with the typical commercially achievable values for $R_A = R_W = 0.98$, Equation (14) implies that the Etendue Folding Illumination System 300 of this invention would be able to achieve a factor of 2 improvement in flux efficiency; i.e. $\lambda_r = 2$, over a conventional illumination system comprised of the reflector 310 stand-alone when the LED device 320 surface reflectance $R_s \geq 0.74$, a surface reflectance value which is attained by many commercially available LED devices, in particular LED devices incorporating the light extraction improvement means described in the background section, including intra LED die recycling means and photonic lattice means.

The flux efficiency improvement that can be attained by the Etendue Folding Illumination System 300 of this invention is a direct consequence of the luminance gain it can achieve, which is one of its most important and unique features in comparison with prior art illumination systems. As shown in FIG. 6, the Etendue Folding Illumination System 300 of this invention can achieve a luminance gain when compared with the limiting case when there is no recycling, which would be the case when the aperture stop 330 is not reflective—meaning the case when the reflector 310 is used as a stand-alone illuminator in conjunction with a non-reflective aperture stop having a clear aperture that matches the target etendue. In such a case, the luminance at the illumination system output clear aperture would equal to the luminance of the LED source coupled into its input aperture 315. As shown in FIG. 6, the luminance at the clear aperture 335 of the Etendue Folding Illumination System 300 of this invention is substantially higher than the luminance of the LED source 320 coupled into its input aperture 315. Also as shown in FIG. 6, the luminance gain that can be achieved by the Etendue Folding Illumination System 300 of this invention increases with the increase in the reflectance factor R.

The luminance gain and the resultant flux efficiency improvement that can be achieved by the Etendue Folding Illumination System 300 of this invention are uncommon features that are not shared by prior art illumination systems—as such would need to be rationalized. The luminance gain and the resultant flux efficiency improvement that can be achieved by the Etendue Folding Illumination System 300 of this invention are a direct consequence of its etendue folding characteristics. As explained earlier, the net effect of coupling the reflective aperture stop 330 onto the output aperture 325 of the reflector 310 is that the etendue associated with the reflective portion of the reflective aperture stop 330 would be folded back onto the reflector 310, thus leaving the much smaller etendue associated with the clear aperture 335 to become the exit (output) etendue of the illumination system 300. This would imply that only the fraction $g=(G_t/G_s)$ of the flux can exit output aperture 335 and the balance of the flux $(1-g)$ would be recycled back into the Folded Collimator/Concentrator 340. In effect the Folded Collimator/Concentrator 340 together with the reflective surface of the LED device 320 coupled onto its input aperture 315 would act as a "leaky integrator" of the flux generated by the LED device 320 that would have an integrated flux equal to $\Phi_c=\Phi_{in}/\{1-R(1-g)\}$, emerging from the same etendue value $G_s$ of the LED device 320, but higher than the flux generated by the LED device 320 by a factor of $[1/\{1-R(1-g)\}]$. In using Equation (2) and since both $\Phi_c$ and $\Phi_{in}$ are emerging from the same etendue value $G_s$, the higher value of integrated flux $\Phi_c$ will be converted into a corresponding increase in luminance by a factor of $[1/\{1-R(1-g)\}]$, which represents the luminance gain that can be achieved by the Etendue Folding Illumination System 300. Based on the above explanation, luminance gain and the resultant flux efficiency improvement that can be achieved by the Etendue Folding Illumination System 300 of this invention are fully consistent with the principles of conservation of etendue and flux.

When compared to prior art illumination systems, the improvement in the flux efficiency that can be achieved by the Etendue Folding Illumination System 300 of this invention is due to the fact that instead of vignetting the flux in excess of what can be coupled into the target etendue $G_t$, which equals to $(1-g)$, the Etendue Folding Illumination System 300 of this invention conserves this excess of flux by having it recycled through the Folded Collimator/Concentrator 340 and the reflective surface of the LED device 320 coupled onto its input aperture 315. Table 2 below shows the flux efficiency and luminance gain advantages of the Etendue Folding Illumination System 300 of this invention in comparison with a prior art illumination system that is comprised of the reflector 310 stand-alone for different values of target-to-source etendue ratio (g) and different values of reflectance factor (R).

TABLE 2

Efficiency Improvements of the Etendue Folding Illumination System 300.

| g | R | Performance Parameter | Prior Art Illumination System (310 stand-alone) | Etendue Folding Illumination System 300 |
|---|---|---|---|---|
| 0.2 | 0.75 | $\epsilon$ | 0.2 | 0.5 |
|  |  | $\lambda$ | 1.0 | 2.5 |
|  | 0.85 | $\epsilon$ | 0.2 | 0.63 |
|  |  | $\lambda$ | 1.0 | 3.13 |
| 0.3 | 0.75 | $\epsilon$ | 0.3 | 0.63 |
|  |  | $\lambda$ | 1.0 | 2.1 |
|  | 0.85 | $\epsilon$ | 0.3 | 0.74 |
|  |  | $\lambda$ | 1.0 | 2.47 |
| 0.4 | 0.75 | $\epsilon$ | 0.4 | 0.74 |
|  |  | $\lambda$ | 1.0 | 1.82 |
|  | 0.85 | $\epsilon$ | 0.4 | 0.82 |
|  |  | $\lambda$ | 1.0 | 2.04 |
| 0.5 | 0.75 | $\epsilon$ | 0.5 | 0.8 |
|  |  | $\lambda$ | 1.0 | 1.6 |
|  | 0.85 | $\epsilon$ | 0.5 | 0.87 |
|  |  | $\lambda$ | 1.0 | 1.74 |

The performance comparison example in Table 2 does not take into account the efficiency loses that would typically occur in prior art illumination systems, such as the reflector 310 as a stand-alone illuminator, due to the mismatch between the aspect ratio of the LED light source 320 and the input aperture 315. Accordingly the efficiency performance of a prior art illumination system that is comprised of the reflector 310 stand-alone would typically be less than the values outlined in Table 2. As explained in subsequent discussion, the Etendue Folding Illumination System 300 would not suffer such efficiency loses because the characteristics of its input aperture 315 and its output clear aperture 335 are substantially decoupled, allowing the Etendue Folding Illumination System 300 to be able to substantially attain the flux efficiency performance outlined in Table 2.

As shown in the performance comparison example in Table 2, the Etendue Folding Illumination System 300 can attain substantial improvement in flux efficiency when compared with a prior art illumination system that is comprised of the reflector 310 stand-alone even at moderate values of the reflectance factor R. Furthermore, the improvement in flux efficiency that can be achieved by the Etendue Folding Illumination System 300 increases with the increase in the reflectance factor R. It is worth noting from the performance comparison of Table 2 above and FIG. 5 that similar to the case of a prior art illumination system that is comprised of the reflector 310 stand-alone, the flux efficiency of the Etendue Folding Illumination System 300 of this invention improves with the increase in the value of target-to-source etendue ratio (g), which imply that a multiplicity of the Folded Collimator/Concentrators 340 used in conjunction with a light combining means can be utilized to maintain the value of the target-to-source etendue ratio (g) of each Folded Collimator/Concentrator 340 comprising the Etendue Folding Illumination System 300 within a range that will maximize the flux efficiency achieved by the overall illumination system. Further embodiments of this invention illustrating various implementations of the Etendue Folding Illumination System 300 that are comprised of a multiplicity of Folded Collimator/Concentrator 340 used in conjunction with light combining means in order to maximize the flux efficiency will be presented in the following paragraphs.

The preceding example presented in Table 2 showed how the Etendue Folding Illumination System 300 of this invention can be used to achieve a desired target etendue that is smaller than the etendue of the LED device 320 while achieving flux efficiency and luminance gain that are not achievable by prior art illumination systems. As mentioned earlier, another advantage of the Etendue Folding Illumination System 300 of this invention is that its clear aperture 335 can be made to match not only the target etendue value but also its aspect ratio. As explained earlier, the mismatch in the aspect ratio of the illumination system output aperture and the imager used in the projection system would cause degradation in the flux efficiency that can be achieved by prior art illumination systems (see Table 1). Table 3 below shows the flux efficiency and luminance gain advantages of the Etendue Folding Illumination System 300 of this invention in comparison with a prior art illumination system that is comprised of the reflector 310 stand-alone for different aspect ratios that are typically used in projection systems. The comparison example of Table 3 is shown for illumination systems that use a square cross section reflector 310 or a circular cross section reflector 311. In the example of Table 3 the comparison is made with different values of reflectance factor (R) and the values of target-to-source etendue ratio (g) were selected such that a prior art illumination system that is comprised of the reflector 310 stand-alone would achieve the maximum flux efficiency possible.

TABLE 3

Vignetting Improvements of the Etendue Folding Illumination System 300.

| Aspect Ratio | g | R | Performance Parameter | Prior Art Illumination System (310 stand-alone) | Etendue Folding Illumination System 300 |
|---|---|---|---|---|---|
| Square Cross Section ||||||
| 4:3 | 0.75 | 0.75 | $\epsilon$ | 0.75 | 0.92 |
|  |  |  | $\lambda$ | 1.0 | 1.23 |
|  |  | 0.85 | $\epsilon$ | 0.75 | 0.9524 |
|  |  |  | $\lambda$ | 1.0 | 1.27 |
| 16:9 | 0.5625 | 0.75 | $\epsilon$ | 0.5625 | 0.83 |
|  |  |  | $\lambda$ | 1.0 | 1.23 |
|  |  | 0.85 | $\epsilon$ | 0.5625 | 0.8955 |
|  |  |  | $\lambda$ | 1.0 | 1.592 |
| Circular Cross Section ||||||
| 4:3 | 0.61 | 0.75 | $\epsilon$ | 0.61 | 0.8622 |
|  |  |  | $\lambda$ | 1.0 | 1.4134 |
|  |  | 0.85 | $\epsilon$ | 0.61 | 0.9125 |
|  |  |  | $\lambda$ | 1.0 | 1.4959 |
| 16:9 | 0.14 | 0.75 | $\epsilon$ | 0.14 | 0.3944 |
|  |  |  | $\lambda$ | 1.0 | 2.8169 |
|  |  | 0.85 | $\epsilon$ | 0.14 | 0.5204 |
|  |  |  | $\lambda$ | 1.0 | 3.7175 |

As shown in the performance comparison example in Table 3, because the Etendue Folding Illumination System 300 can independently match the aspect ratios of the target etendue and the LED light source, it can attain substantial improvement in flux efficiency when compared with a prior art illumination system that is comprised of the reflector 310 stand-alone even at moderate values of the reflectance factor (R). Furthermore, the improvement in flux efficiency that can be achieved by the Etendue Folding Illumination System 300 increases with the increase in the reflectance factor (R).

The performance comparison example in Table 3 does not take into account the efficiency loses that would typically occur in prior art illumination systems, such as the reflector 310 as a stand-alone illuminator, due to the mismatch between the aspect ratio of the LED light source 320 and the input aperture 315. Accordingly the efficiency performance of a prior art illumination system that is comprised of the reflector 310 stand-alone would typically be less than the values outlined in Table 3. As explained earlier the tight coupling between the aspect ratios of the LED light source 320, the cross section of the reflector 310 and the imager 130 would typically prevent a prior art illumination system comprised of the reflector 310 as a stand-alone illuminator from attaining the highest possible efficiency. In contrast, the etendue folding and light recycling aspects of the Etendue Folding Illumination System 300 enables the matching of the aspect ratio of the target etendue at the output clear aperture 335 substantially independently from the aspect ratio of the cross section of the folded collimator/concentrator 340, thus allowing the aspect ratio of the cross section of the folded collimator/concentrator 340 to be designed such that the aspect ratio of the input aperture 315 substantially matches the aspect ratio of the LED light source 320. In effect the etendue folding and light recycling capabilities of the Etendue Folding Illumination System 300 makes it possible to substantially decouple the aspect ratios of the input aperture 315 and the output aperture 335 of the Etendue Folding Illumination System 300. Such a decoupling allows the Etendue Folding Illumination System 300 to match the aspect ratio of the target etendue at its output aperture 335 while independently matching the aspect ratio of the LED light source 320 at its input aperture 315. In addition to allowing the Etendue Folding Illumination System 300 not to suffer from the input aperture 315 and LED light source 320 aspect ratios mismatch common in prior art illumination systems, this decoupling allows the folded collimator/concentrator 340 cross section to be optimized for matching the aspect ratio of the LED light source 320 coupled onto its input aperture 315, thus allowing the Etendue Folding Illumination System 300 to be able to substantially attain the flux efficiency performance outlined in Table 3.

In all of the examples presented earlier, air gap coupling was assumed in coupling the LED device 320 onto the reflector input aperture 315. As explained in the Background Section, in order to improve the extraction efficiency of the LED device 320, index matched coupling is often used in conjunction with solid dielectric filled reflector 310 to couple the LED source 320 into the reflector input aperture 315. However, as explained earlier such an improvement in the extraction efficiency is not being harnessed in prior art illumination systems because even though with index matched coupling the generated flux could be increased by a factor of 1.5, the etendue at the input aperture of the illumination system increases by a disproportional factor of $n^2=2.25$, thus causing a net reduction in the illumination system efficiency. Unlike prior art illumination systems that are comprised of the reflector 310 stand-alone, the etendue folding capability of the Etendue Folding Illumination System 300 compensates for the increase in etendue that would be caused by using index matching, thus allowing the illumination system to benefit from the increase in flux that can be achieved by index matched coupling. Table 4 provides a comparison of the flux efficiency that can be achieved in using index matched coupling relative to the flux efficiency that can achieved in using air gap coupling at various values of target-to-source etendue for conventional illumination systems and the Etendue Folding Illumination System 300.

TABLE 4

Extraction Improvements of the Etendue Folding Illumination System 300

| Target-to-Source Etendue Ratio (g) | {$\text{Flux}_{Index\ Matched}/\text{Flux}_{Air\ Gap}$} ||||
|---|---|---|---|---|
|  |  |  | Prior Art | Etendue Folding |
|  | Air Gap Coupling | Index Matched Coupling | Illumination System (310 stand-alone) | Illumination System 300 ||
|  |  |  |  | R = 0.75 | R = 0.85 |
| 0.5 | 0.22 | 0.667 | 0.994 | 1.126 |
| 0.7 | 0.31 | 0.667 | 1.067 | 1.197 |
| 0.9 | 0.40 | 0.667 | 1.121 | 1.245 |

As shown in the performance example in Table 4, due to the disproportional increase in the flux and etendue associated with index matched coupling, the flux output of a prior art illumination system that is comprised of the reflector 310 stand-alone in which the LED device 320 is index matched coupled would be only two thirds of that of a comparable illumination system in which the LED device is air gap coupled, even though the flux extracted from the LED device is 1.5 times higher. As shown in Table 4, because of its ability to decouple the area and aspect ratio characteristics of the source and the target etendue, the Etendue Folding Illumination System 300 of this invention would be able to output a substantial portion of the extra flux extracted from an index matched LED device 320 especially at higher values of target-to-source etendue values. The results shown in Table 4 suggest that coupling the LED device using index matching would be beneficial in illumination systems that are comprised of a multiplicity of Folded Collimator/Concentrator 340 in conjunction with a light combining means in which each of the Folded Collimator/Concentrator 340 can operate at a higher value of target-to-source etendue ratio (g).

Another advantage that is a consequence of the Etendue Folding Illumination System 300 ability to decouple the area and aspect ratio characteristics of the source and the target etendue is the ability to tailor the shape of its output clear aperture 335 to match the shape of the target etendue at an inclined angle. In typical prior art projection systems, the illumination axis of the imager used is typically inclined relative to the reflective surface of the imager, which would cause the illumination patch generated by the illumination system to become mismatched with the shape of the target reflective area of the imager due to keystone effects, thus causing additional flux efficiency degradations due to vignetting. In prior art illumination systems the vignetting due to the illumination axis inclination is typically compensated for by complex optical means. In the case of the Etendue Folding Illumination System 300 of this invention the vignetting due to inclination of the illumination axis would be eliminated by simply making the shape of the output clear aperture 335 equal to that of the imager area projected by the inclination angle of the illumination axis onto the plane of the output clear aperture 335, thus achieving further flux efficiency improvement.

As explained earlier, a reflector 310 that is designed to achieve the collimation angle required by typical imagers used in projection systems 100, for example the 12° collimation angle required by a typical projection system that use micro-mirror imagers, would have a sufficient length to enable it to achieve sufficient uniformity. However, when such a reflector 310 is used in a color sequential type projection system and having coupled into its input aperture 315 an LED light source 320 which is comprised of multiple LED dies of multiple colors, the uniformity it can achieve for each color would tend to degrade below the acceptable limits stated. In order to overcome this limitation the length of the reflector 310 is typically extended by adding vertical walls, which act as a homogenizing length $L_H$, which would improve the uniformity to within the required levels. As explained earlier, in order to achieve the level of uniformity typically required in projection systems, the overall length of the illumination system ($L_C+L_H$) would need to become at least twice the collimation length $L_C$, which would reduce the compactness of the illumination system and increase its cost. Because of its etendue folding and light recycling characteristics, the Etendue Folding Illumination System 300 of this invention overcomes this drawback since the light would be recycled multiple times between the walls of the Folded Collimator/Concentrator 340 and the reflective surface of the LED device 320. Since only the fraction $g=(G_t/G_s)$ of the integrated flux $\Phi_C$ can exit the clear aperture 335 and the balance of the flux (1−g) would be recycled back into the Folded Collimator/Concentrator 340, the reflector 310 length $L_C$ would in effect be used as a homogenization length in addition to being used as a collimation length, with the average number of recycling round trips, designated by the symbol $K_{ave}$, experienced by a typical light ray bundle before it exits the clear aperture 335 being;

$K_{ave}=R(1-g)/\{1-R(1-g)\}$

Which implies that when the reflectance factor R=0.75 and the target-to-source etendue (g) being greater than or equal to 0.67, the typical light ray emerging from the LED device 320 would in the average be recycled through the Folded Collimator/Concentrator 340 at least one time before it exits the clear aperture 335, which would typically be more than sufficient to achieve the level of output collimated light uniformity required by typical projection systems. The ability of the Etendue Folding Illumination System 300 of this invention to effectively use the reflector 310 length $L_C$ for both collimation as well as homogenization would allow it to be more compact as well as less costly when compared with a typical prior art illumination system that is comprised of the reflector 310 with added homogenation length.

As explained earlier, in projection systems applications where a high flux is required, when using an illumination system that is comprised of a single reflector, the value of the target-to-source etendue ratio will tend to decrease as the required number of LED device dies increases. As a result the flux efficiency that can be generated by the illumination system, whether it is comprised of the stand-alone reflector 310 or the Etendue Folding Illumination System 300, will be reduced. The typical approach for achieving higher flux efficiency under such design circumstances is to increase the operating value of the target-to-source etendue ratio by distributing the total number of LED dies used amongst multiple reflectors, such as the reflector 310, then to use combining means to combine the output flux from the multiplicity of reflectors used. Pursuant to such an approach for achieving further improvement of the flux efficiency, FIG. 7A shows the 2$^{nd}$ embodiment of this invention whereby two of the Folded Collimator/Concentrators are used in conjunction with light combining means to attain a further improvement of the flux efficiency performance of the Etendue Folding Illumination System of this invention.

Figure 7A:
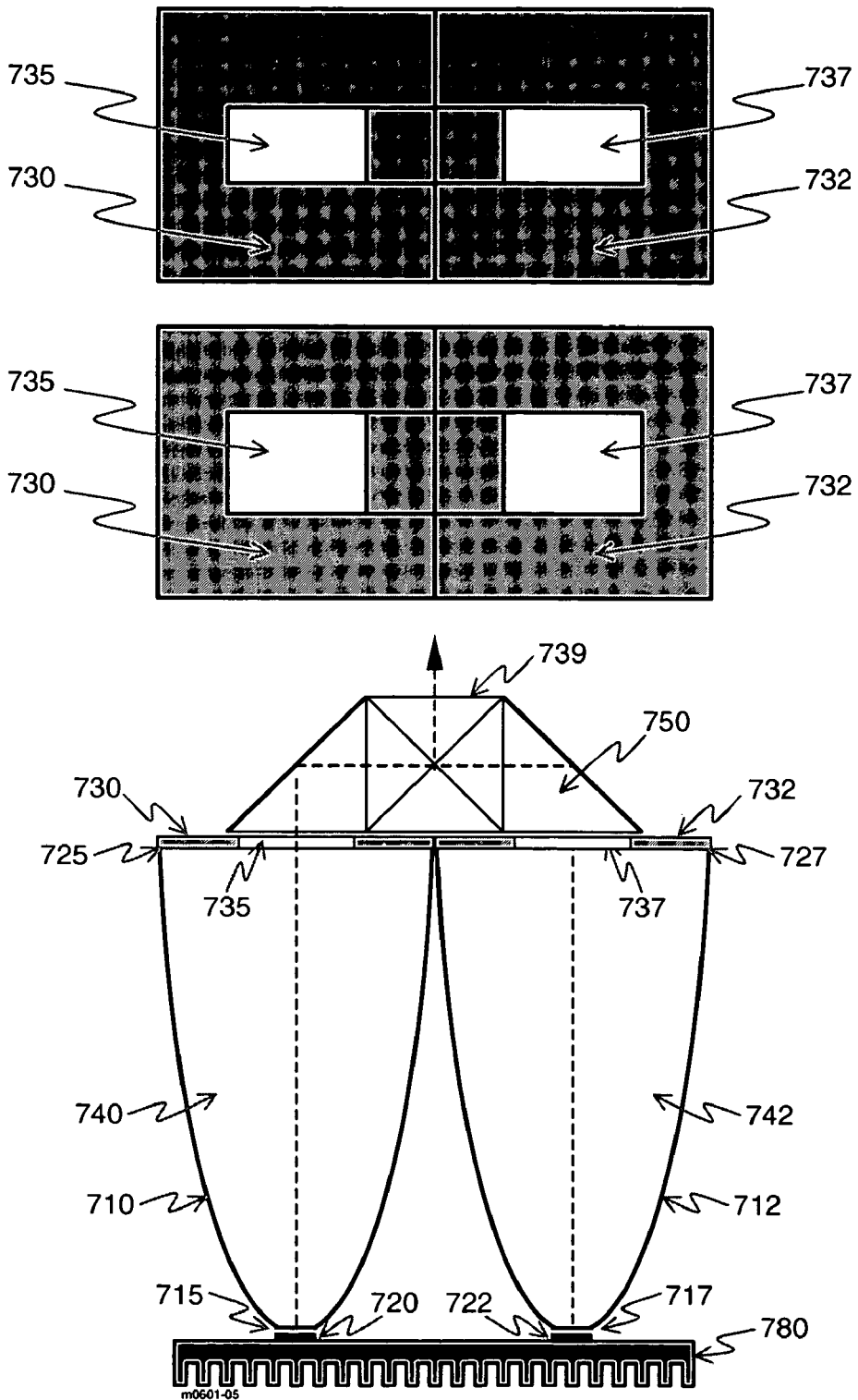
FIG. 7A illustrates a cross-sectional view of the second embodiment of the illumination system of this invention.

Referring to the cross sectional view in FIG. 7A, the multi collimator/concentrator Etendue Folding Illumination System 700 is comprised of two Folded Collimator/Concentrators 740 and 742 and a combining assembly 750. The Folded Collimator/Concentrator 740 is comprised of the reflector 710 having coupled onto its output aperture 725 a reflective aperture stop 730 which incorporate a clear aperture 735 having an area and aspect ratio that matches the area and aspect ratio of the target etendue and having coupled onto its input aperture 715 a light source 720 that is comprised of multiple green LED dies. The Folded Collimator/Concentrator 742 is comprised of the reflector 712 having coupled onto its output aperture 727 a reflective aperture stop 732 which incorporate a clear aperture 737 having an area and aspect ratio that matches area and aspect ratio of the target etendue and having coupled onto its input aperture 717 a light source 722 that is comprised of multiple red and blue LED dies. The coupling of the LED dies onto the input apertures of the Folded Collimator/Concentrator 740 and 742 can be either air gap or index matched coupling. The Folded Collimator/Concentrators 740 and 742 each could have either a circular, square or rectangular cross section, designed to match the area and aspect ratio of the group of LED dies coupled into its input aperture. FIG. 7A shows a cross sectional top view of Etendue Folding Illumination System 700, which illustrate the two clear apertures 735 and 737 being designed to match either a 4:3 or a 16:9 target etendue of a typical projection system.

Figure 7B:
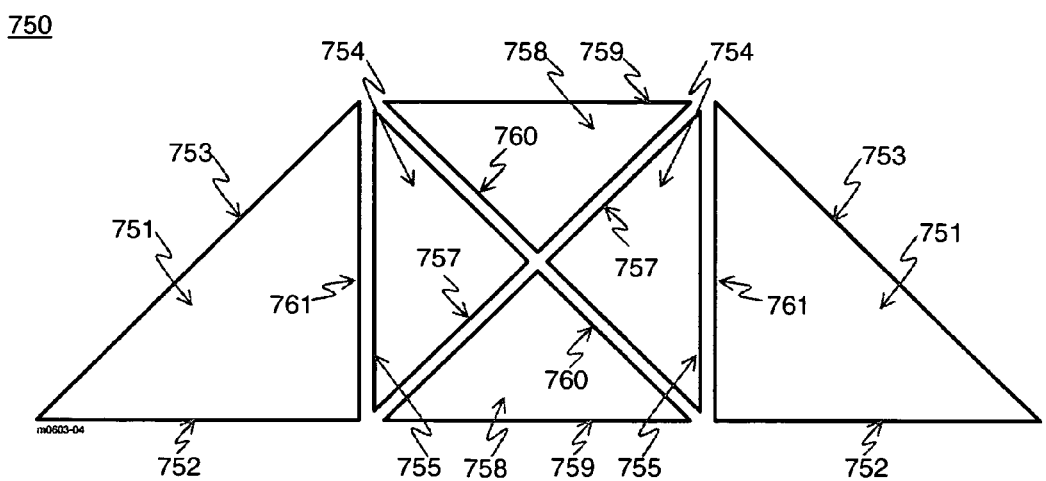
FIG. 7B illustrates cross-sectional view of the combining assembly of the second embodiment of the illumination system of this invention.

The combining assembly 750 illustrated in FIG. 7B would be mounted on top of the two clear apertures 735 and 737 and would be designed to couple the output of the two Folded Collimator/Concentrators 740 and 742 onto the target etendue. Referring to FIG. 7B, the assembly of combining prisms 750 is comprised of three different type of prisms each having a right angle triangular cross section with two equal short sides and one long side; whereby the prisms 751 having their short sides 752 substantially equal to the area and aspect ratio of the clear apertures 735 and 737 and their long sides 753 coated with reflective coating, the prisms 754 having their long sides 755 substantially equal to the area and aspect ratio of the clear apertures 735 and 737 and their short sides 757 coated with green reflective dichroic coating and the prisms 758 having their long sides 759 substantially equal to the area and aspect ratio of the clear apertures 735 and 737 and their short sides 760 coated with red and blue reflective dichroic coating. As illustrated in FIG. 7B, the four prisms 754 and 758 are assembled with their short sides 757 and 760 facing each other and their long sides 755 facing the short sides 761 of the prisms 751. With this arrangement of the prisms 751, 754 and 758, the combining assembly 750 will be able to relay the light emerging from the clear output apertures 735 and 737 onto the output aperture 739 of the Etendue Folding Illumination System 700, whereby (1) the green light emerging from the clear aperture 735 would first be reflected by the reflective coating on the long side 753 of the prism 751 then reflected by the green dichroic coated sides 757 of the prisms 754 towards the output aperture 739 of the Etendue Folding Illumination System 700; and (2) the red or blue light emerging from the clear output aperture 737 would first be reflected by the reflective coating on the long side 753 of the prism 751 then reflected by the Red/Blue dichroic coated sides 760 of the prisms 758 towards the output aperture 739 of the Etendue Folding Illumination System 700. A person skilled in the art would know how to design alternate combining assembles having different arrangements of mirrors and dichroics that can be utilized to couple the output of the two Folded Collimator/Concentrator 740 and 742 into the target etendue. Such alternate combining assemblies would substantially accomplish the same combining function of the assembly shown in FIG. 7B and could result in different overall form factor for the Etendue Folding Illumination System 700.

Referring to FIG. 7B, the areas of the two clear apertures 735 and 737 being smaller than the top cross sectional area of the two Folded Collimator/Concentrators 740 and 742 would allow the placement of the two clear apertures 735 and 737 such that the light coupled from the two Folded Collimator/Concentrators 740 and 742 onto the combining assembly 750 would experience substantially equal path length. This would alleviate the need for additional optical means to equalize the path length of the output light of the two Folded Collimator/Concentrators 740 and 742, which would make the Etendue Folding Illumination System 700 become more compact and more cost effective. Furthermore, the design of the combining assembly 750 illustrated in FIG. 7B allows the two Folded Collimator/Concentrators 740 and 742 to be assembled side-by-side in the same plane, which further reduces the form-factor of the Etendue Folding Illumination System 700 and allows a more compact thermal design using the common heat sink 780 illustrated in FIG. 7A.

In dividing the total number of dies required to generate the target flux into two groups of LED dies with each group of LED dies physically separated from the other groups of LED dies, the Etendue Folding Illumination System 700 would attain an improved thermal efficiency which would allow each individual group of LED dies to be able to operate at a lower junction temperature, which would consequently result in an improvement the operational efficiency, in terms of the flux generated per watt, offered by each group of LED dies. The Etendue Folding Illumination System 700 would attain higher thermal efficiency than a single-reflector illumination system, such as the Etendue Folding Illumination System 300, since in its configuration the total number of dies required to generate the target flux is divide into two physically separated groups of LED dies.

In addition to the improvement in efficiency that would result in by using multiple reflectors to increase the target-to-source etendue ratio, the Etendue. Folding Illumination System 700 would also offer efficiency, vignetting, extraction and uniformity improvements comparable to those discussed earlier for the single-reflector Etendue Folding Illumination System 300. In order to illustrate this point, if the total number of LED dies used in conjunction with a single reflector result in a target-to-source etendue ratio of 0.2, then from Table 3 the efficiency of the single prior art illumination system would be 0.2 and the efficiency of the single reflector Etendue Folding Illumination System 300 with reflectance factor R=0.75, would be 0.5. In using the two reflectors configuration, the target-to-source etendue ratio would increase to 0.4, and as a result the two reflectors prior art illumination system would attain an efficiency of 0.4, however the efficiency of the two reflectors Etendue Folding Illumination System 700 would be 0.75. In comparison with a dual reflector prior art illumination system, the dual reflector Etendue Folding Illumination System 700 would offer efficiency and vignetting comparable to those given in Tables 3 and 4, respectively, with the target-to-source etendue value (g) adjusted to account for the number of reflectors being used. It should be noted that additional implementation loses will occur due to the addition of the light combining means, which would be comparable for the case of a dual reflector prior art illumination system as well as the case of the two reflectors Etendue Folding Illumination System 700. However, the ability of the Etendue Folding Illumination System 700 to efficiently match the target etendue area and aspect ratio is unique and not shared by any prior art illumination system that is comprised of multiple reflectors. Furthermore, the ability of the Etendue Folding Illumination System 700 to efficiently match the optical path length of the collimated output light of the two Folded Collimator/Concentrators 740 and 742 reduces vignetting and further improves the overall efficiency and form-factor of the Etendue Folding Illumination System 700.

Figure 8A:
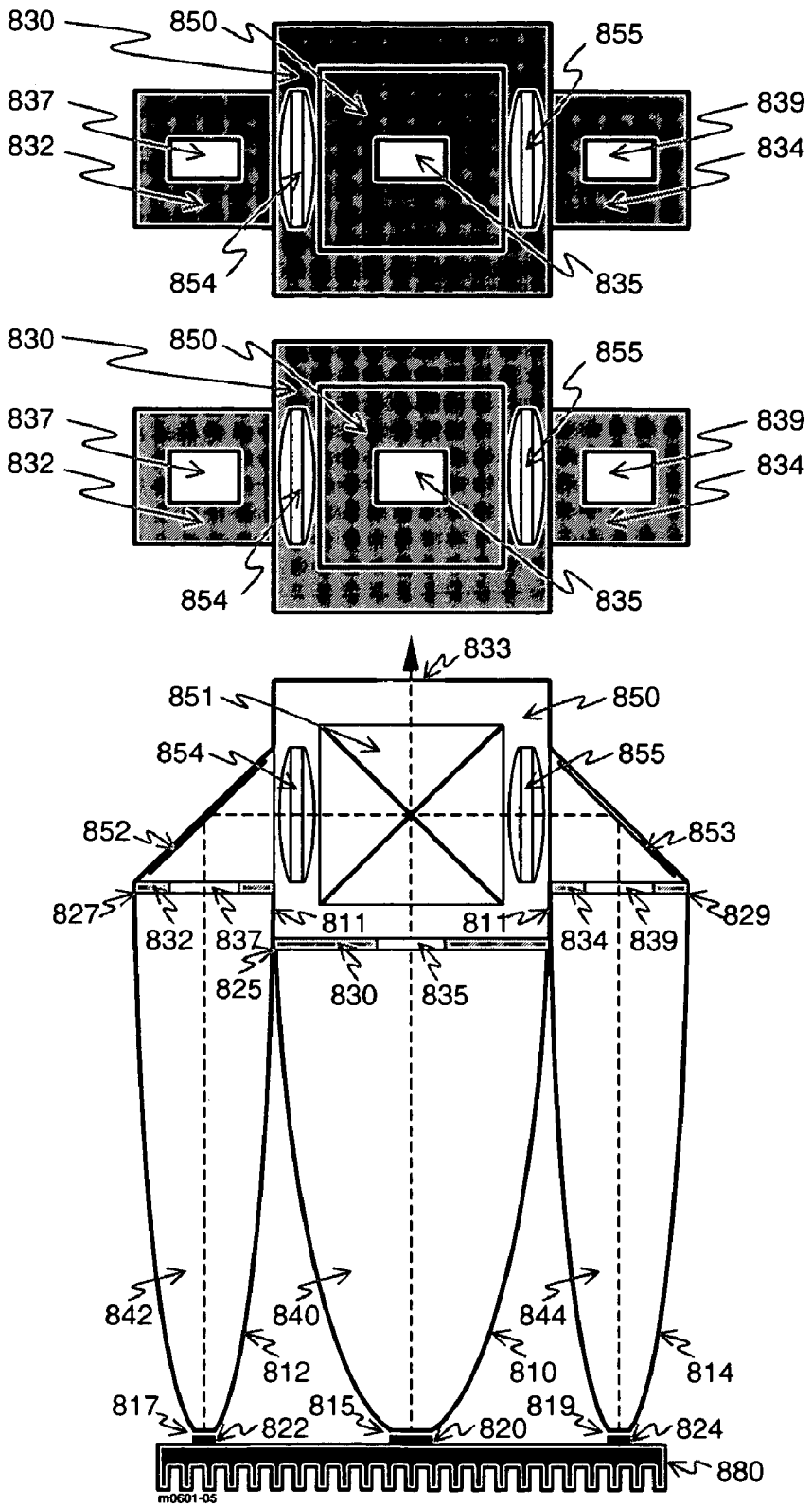
FIG. 8A illustrates a cross-sectional view of the third embodiment of the illumination system of this invention.

FIG. 8A illustrates the $3^{rd}$ embodiment of this invention whereby three Folded Collimator/Concentrators of this invention are used in conjunction with light combining means to attain a further improvement of the flux efficiency performance of the illumination system. Referring to the cross sectional view in FIG. 8A, the multi collimator/concentrator Etendue Folding Illumination System 800 is comprised of three Folded Collimator/Concentrators 840, 842 and 844 and the combining assembly 850. The Folded Collimator/Concentrator 840 is comprised of the reflector 810 having coupled into its output aperture 825 a reflective aperture stop 830 which incorporate the clear aperture 835 having an area and aspect ratio that matches the area and aspect ratio of the target etendue and having coupled into its input aperture 815 a light source 820 that is comprised of multiple green LED dies. The Folded Collimator/Concentrator 842 is comprised of the reflector 812 having coupled into its output aperture 827 a reflective aperture stop 832 which incorporate the clear aperture 837 having an area and aspect ratio that matches the area and aspect ratio of the target etendue and having coupled into its input aperture 817 a light source 822 that is comprised of multiple red LED dies. The Folded Collimator/Concentrator 844 is comprised of the reflector 814 having coupled into its output aperture 829 a reflective aperture stop 834 which contains a clear aperture 839 having an area and aspect ratio that matches the area and aspect ratio of the target etendue and having coupled into its input aperture 819 a light source 824 that is comprised of multiple blue LED dies.

The coupling of the LED dies 820, 822 and 824 onto the input apertures of the Folded Collimator/Concentrators 840, 842 and 844; respectively, can be either air gap of index matched coupling. The Folded Collimator/Concentrators 840, 842 and 844 each could have by way of example, either a circular, square or rectangular cross section, designed to match the area and aspect ratio of the group of LED dies coupled into its input aperture. FIG. 8A shows a cross sectional top view of the Etendue Folding Illumination System 800, which illustrate the three clear apertures 835, 837 and 839 being designed to match either a 4:3 or a 16:9 of the target etendue typical in most projection systems.

Figure 8B:
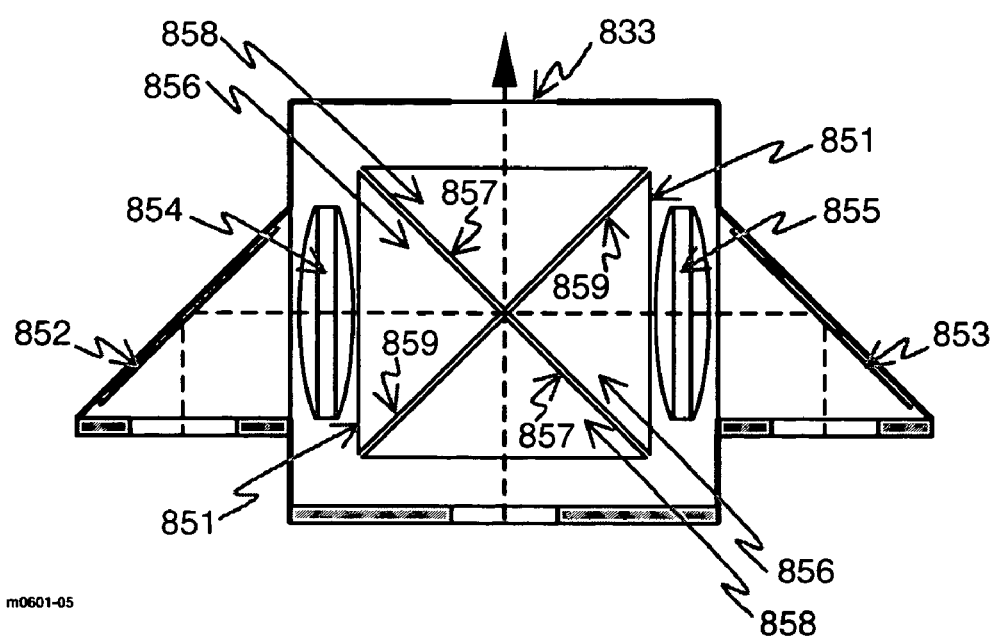
FIG. 8B illustrates cross-sectional view of the combining assembly of the third embodiment of the illumination system of this invention.

The combining assembly 850 illustrated in FIG. 8B is mounted on top of the three clear apertures 835, 837 and 839 and is designed to couple the output of the three Folded Collimator/Concentrators 840, 842 and 844 onto the target etendue. Referring to FIG. 8B, the combining assembly 850 is comprised of the four-prism assembly 851, two reflective mirrors 852 and 853, and two relay lenses 854 and 855. The reflective mirror 852 and the relay lens 854 combined are designed to couple the output light of the Folded Collimator/Concentrator 842 onto the four-prism assembly 851 while the reflective mirror 853 and the relay lens 855 combined are designed to couple the output light of the Folded Collimator/Concentrator 844 onto the four-prism assembly 851. The four-prism assembly 851 is comprised of two different types of prisms each having a right angle triangular cross section with two equal short sides and one long side; whereby the prisms 856 having their short sides 857 coated with blue reflective dichroic coating and the prisms 858 having their short sides 859 coated with red reflective dichroic coating. As illustrated in FIG. 8B, the four prisms 856 and 858 are assembled with their short sides 857 and 859 facing each other and their long side 851 facing the two relay lenses 854 and 855. With this arrangement of the prisms 856 and 858 in conjunction with the two relay lenses 854 and 855 and the two reflective mirrors 852 and 853, the combining assembly 850 will be able to relay the light emerging from the clear output apertures 835, 837 and 839 onto the output aperture 833 of the Etendue Folding Illumination System 800, whereby (1) the green light that emerges from the clear aperture 835 would be directly transferred to the output aperture 833 of the Etendue Folding Illumination System 800; (2) red light that emerges from the clear output aperture 837 would first be reflected by the mirror 852 then reflected by the red dichroic coated sides 859 of the prisms 856 towards the output aperture 833 of the Etendue Folding Illumination System 800; and (3) the blue or blue light that emerges from the clear output aperture 839 would first be reflected by the mirror 853 then reflected by the blue dichroic coated sides 857 of the prisms 858 towards the output aperture 833 of the Etendue Folding Illumination System 800. A person skilled in the art would know how to design alternate combining assembles having different arrangements of mirrors and dichroics that can be utilized to couple the output of the three Folded Collimator/Concentrator 840, 842 and 844 onto the target etendue. Such alternate combining assemblies would substantially accomplish the same combining function of the combining assembly 850 shown in FIG. 8B and could result in different overall form factor for the Etendue Folding Illumination System 800.

In order to achieve effective combining of the collimated light in typical prior art illumination systems that are comprised of multiple reflectors, the design characteristics of the multiple reflectors must be substantially the same. Which would dictate that the size of the emitting surface the LED device coupled into each reflector, their collimation angle, and subsequently the area of the reflectors output apertures, must be substantially the same. In typical prior art illumination systems that are comprised of three reflectors, such a limitation places a limit on the total number of green LED dies that can be used, thus either limiting the color gamut that can be generated by the illumination system, or the illumination system would have to use more red and blue LED dies than what is required to generate a full (balanced) color gamut, which would tend to increase the total cost of the illumination system. The Etendue Folding Illumination System 800 would not suffer from such limitations because the output etendue of each of the three Folded Collimator/Concentrators 840, 842 and 844 can be designed to be substantially equal regardless of the number of LED dies coupled into each of their input apertures. In effect, each of the three Folded Collimator/Concentrators 840, 842 and 844 can be designed to operate at a different target-to-source etendue ratio (g), thus allowing the Etendue Folding Illumination System 800 to be able to efficiently and cost effectively be designed to generate a full color gamut with the required target etendue.

In order to be able to generate a full color gamut, the Folded Collimator/Concentrator 840, illustrated in FIG. 8A, would typically have coupled onto its input aperture 815 twice as many green LED dies than the number of red LED dies coupled onto the input apertures of the Folded Collimator/Concentrator 842 or the number of blue LED dies coupled onto the input aperture of the Folded Collimator/Concentrator 844. As a consequence the Folded Collimator/Concentrator 842 and 844 would be shorter in length than the Folded Collimator/Concentrator 840. The design of the Etendue Folding Illumination System 800 illustrated in FIG. 8A demonstrates a compact form-factor design for combining the collimated light output of the three Folded Collimator/Concentrators 840, 842 and 844 being of different length. A person skilled in the art would know how to design alternate illumination system configurations that would use the three Folded Collimator/Concentrators 840, 842 and 844 of different lengths.

In the design of the Etendue Folding Illumination System 800 illustrated in FIG. 8A, in order to equalize the effect of the longer optical path length experienced by the light output of the Folded Collimator/Concentrators 842 and 844, their output collimation angle is designed to be slightly smaller than the collimation angle required for the target etendue and the two relay lenses 853 are added within the combining assembly 850 to make their etendue equal to the required target etendue prior to being coupled onto the combining dichroic prisms 854 and 855. In making the output collimation angle of the Folded Collimator/Concentrators 842 and 844 slightly smaller than the collimation angle required for the target etendue; their length would increase, and in order to achieve effective coupling onto the combining assembly 850, their length is extended through the addition of the vertical reflective walls 811 to make overall length of the three Folded Collimator/Concentrator 840, 842 and 844 substantially equal as illustrated in FIG. 8A. The design of the combining assembly 850 illustrated in FIG. 8B allows the three Folded Collimator/Concentrators 840, 842 and 844 to be assembled side-by-side in the same plane, which further reduces the form-factor of the Etendue Folding Illumination System 800 and allows a more compact thermal design using the common heat sink 880 illustrated in FIG. 8A.

In dividing the total number of dies required to generate the target flux into three groups of LED dies with each group of LED dies physically separated from the other groups of LED dies, the Etendue Folding Illumination System 800 would attain an improved thermal efficiency which would allow each individual group of LED dies to be able to operate at a lower junction temperature, which would consequently result in an improvement the operational efficiency, in terms of the flux generated per watt, offered by each group of LED dies. The Etendue Folding Illumination System 800 would attain higher thermal efficiency than other multiple reflector illumination systems, such as the Etendue Folding Illumination System 700, since in its configuration the total number of dies required to generate the target flux is divide into three physically separated groups of LED dies.

In addition to its ability to cost effectively generate a full color gamut, the Etendue Folding Illumination System 800 would also attain the improvement in flux efficiency that would result by using multiple reflectors comparable to those discussed earlier for the Etendue Folding Illumination System 700. In order to illustrate this point, if the total number of LED dies used in conjunction with a single reflector results in a target-to-source etendue ratio of 0.2, then from Table 3 the efficiency of the single prior art illumination system would be 0.2 and the efficiency of the single reflector Etendue Folding Illumination System 300 with reflectance factor R=0.75 would be 0.5. In using a three-reflector illumination system configuration of the Etendue Folding Illumination System 800, the target-to-source etendue ratio for Folded Collimator/Concentrator 840 would increase to 0.4, and the target-to-source etendue ratio for Folded Collimator/Concentrator 842 and 844 would increase to 0.8, and as a result the Etendue Folding Illumination System 800 would achieve an efficiency of 0.84. In comparison with three-reflector prior art illumination systems, the three-reflector Etendue Folding Illumination System 800 would offer flux efficiency and vignetting comparable to those given in Tables 3 and 4, respectively, with the value of the target-to-source etendue ratio (g) adjusted to account for the number of reflectors being used and the total flux contributed by each of the three Folded Collimator/Concentrators 840, 842 and 844. It should be noted that additional implementation loses will occur due to the addition of the light combining means, which would be comparable for the case of a three-reflector prior art illumination system as well as the case of the three-reflector Etendue Folding Illumination System 800. However, the ability of the Etendue Folding Illumination System 800 to efficiently match the target etendue area and aspect ratio is unique and not shared by any prior art illumination system that are comprised of multiple reflectors. Furthermore, the ability of the Etendue Folding Illumination System 800 to effectively couple a different number of LED dies in each one of its Folded Collimator/Concentrators while efficiently matching the target etendue area and aspect ratio is also unique and not shared by any prior art illumination system that is comprised of multiple reflectors.

Figure 9:
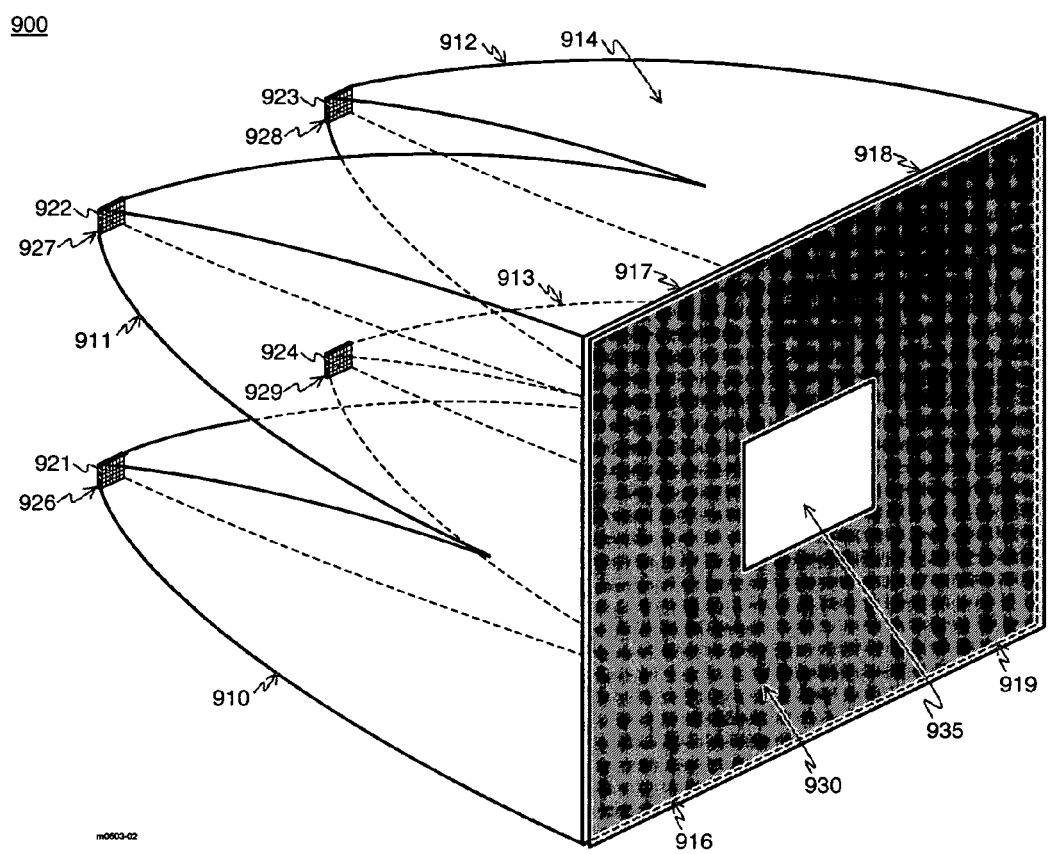
FIG. 9 illustrates an isometric view of the forth embodiment of the illumination system of this invention.

FIG. 9 illustrates the $4^{th}$ embodiment of this invention whereby four of the Folded Collimator/Concentrators of this invention are used to realize the performance advantages gained by etendue folding with a much more compact form-factor. As illustrated in FIG. 9, the Etendue Folding Illumination System 900 is comprised of four folding collimator/concentrator 910, 911, 912 and 913 arranged in a tiled configuration and having their heights extended and conjoined to form the combining stem 914 and having their reflective aperture stops conjoined into a single reflective aperture stop 930 whereby the four folding collimator/concentrators 910, 911, 912 and 913 each having coupled onto their input apertures 926, 927, 928 and 929 a light source 921, 922, 923 and 924 that is comprised of a plurality of LED dies of the same or of multiple colors and having their conjoined reflective aperture stop 930 incorporating an output clear aperture 935 that is substantially centered within conjoined reflective aperture stop 930 and having collimation angle, area and aspect ratio characteristics that match the corresponding parameters of a target etendue.

The multiple LED dies can either be index matched or air gap coupled onto the input apertures 926, 927, 928 and 929 and can differ in number and can either all be comprised of a single color LED dies or multiple color LED dies as required to achieve the required color balance at the output of the Etendue Folding Illumination System 900. As illustrated in FIG. 9, the four folding collimator/concentrators 910, 911, 912 and 913 are shown to be substantially identical to each other in terms of the shape of their cross section and the number of LED dies coupled into their input apertures. However, the cross sectional shape of each of the four folding collimator/concentrators 910, 911, 912 and 913 can either be a square shape or a rectangular shape that would match the aspect ratio of the multiple LED dies 921, 922, 923 and 924 coupled onto their input apertures 926, 927, 928 and 929.

As illustrated in FIG. 9, the reflective aperture stop 930 has an area and aspect ratio that substantially equals the conjoined area of the output apertures 916, 917, 918 and 919 of the four folding collimator/concentrators 910, 911, 912 and 913 and incorporate a clear aperture 935 that matches the target etendue area and aspect ratio. Similar to the previous embodiments of this invention, the coupling of the reflective aperture stop 930 onto the output apertures of the four folding collimator/concentrators 910, 911, 912 and 913 would cause the collimated light not exiting the clear aperture 935 to be reflected back and coupled onto the apertures 916, 917, 918 and 919, then concentrated by the four folding collimator/concentrators 910, 911, 912 and 913 and coupled onto their input apertures 926, 927, 928 and 929 where it is reflected by the reflective surfaces of the LED devices 921, 922, 923 and 924 and combined with the light emerging from the LED dies 921, 922, 923 and 924 and then collimated in its way back through four folding collimator/concentrators 910, 911, 912 and 913 toward the reflective aperture stop 930. In effect the coupling of the reflective aperture stop 930 onto the conjoined output apertures of the four folding collimator/concentrator 910, 911, 912 and 913 would cause the Etendue Folding Illumination System 900 to have etendue folding and light recycling capabilities that are substantially similar to those of the Etendue Folding Illumination Systems 300, 700 and 800.

An added advantage of the of the Etendue Folding Illumination System 900 is that it does not required the use of a dichroic mirror assembly to combine the output of its four reflectors, as a consequence the Etendue Folding Illumination System 900 would be more compact and more cost effective than other illumination systems having the same number of LED dies coupled onto their input aperture. Furthermore, the design of the Etendue Folding Illumination System 900 illustrated in FIG. 9 allows the four reflectors 910, 911, 912 and 913 to be assembled side-by-side, which would reduce the form-factor of the Etendue Folding Illumination System 900 and allows a more compact thermal design using a common heat sink.

Furthermore, in dividing the total number of dies required to generate the target flux into multiple groups of LED dies with each group of LED dies physically separated from the other groups of LED dies, the Etendue Folding Illumination System 900 would attain an improved thermal efficiency which would allow each individual group of LED dies to be able to operate at a lower junction temperature, which would consequently result in an improvement the operational efficiency, in terms of the flux generated per watt, offered by each group of LED dies. The Etendue Folding Illumination System 900 would attain higher thermal efficiency than other illumination systems that are comprised of multiple reflectors, such as the Etendue Folding Illumination Systems 700 and 800, since in its configuration the total number of dies required to generate the target flux is divide into larger number of groups of LED dies that are physically separated.

In addition to being able to attain the efficiency, vignetting, extraction and uniformity improvements comparable to those discussed earlier for the single-reflector Etendue Folding Illumination System 300, the Etendue Folding Illumination System 900 would be able to attain a substantially reduced form-factor. In order to illustrate this point if the total number of LED dies required to be used in conjunction with a the Etendue Folding Illumination System 300 having a desired target-to-source etendue ratio are divided into four groups each with equal number of LED dies with each of one of these four groups of LED dies coupled into the input aperture of four identical reflectors that are designed to achieve the same collimation angle, then it follows from Equation (4) that the top side and height dimensions of these four reflectors would be half of the side height dimensions of the reflectors used in conjunction with the Etendue Folding Illumination System 300. In arranging these four folding collimator/concentrators 910, 911, 912 and 913 reflectors as depicted in FIG. 9, the side dimensions of their conjoined output apertures would then be equal to that of the Etendue Folding Illumination System 300 and the height of a Etendue Folding Illumination System 900 that is comprised of these four folding collimator/concentrator will be half of the height of the Etendue Folding Illumination System 300 plus the added height of the combining stem 914, which would typically be much less than the height of the four reflectors comprising the Etendue Folding Illumination System 900. A person skilled in the art would know that the Etendue Folding Illumination System 900 can be implemented with more than four reflectors and would also know that dividing the total number of LED dies needed to achieve a target flux into more than four groups coupled into the input aperture of more than four reflectors would result in further reduction in the height of the Etendue Folding Illumination System 900.

In projection systems that use a micro mirror device as an imager, the angle of collimation is required to be relatively small along only one axis, being the axis that is perpendicular to the hinge axis of the micro mirror, hereby referred to as the collimation axis, and otherwise the angle of collimation is unrestricted. In such projection systems, it would be beneficial for the illumination system to be able to generate an illumination patch that efficiently matches the imager etendue area and aspect ratio as well as its collimation axis. The benefits to be gained in matching the collimation axis of the imager is a substantial reduction in vignetting loses particularly in the case of 16:9 high definition aspect ratio. Prior art illumination systems are not able to achieve such an objective.

Figure 10:
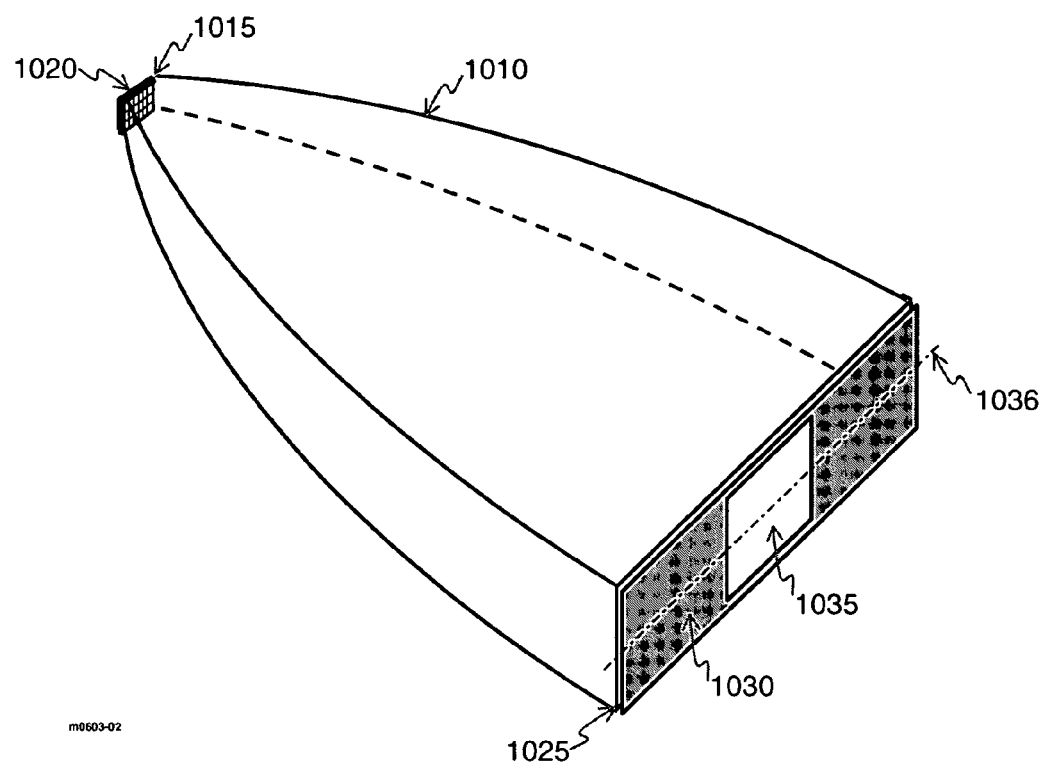
FIG. 10 illustrates an isometric view of the fifth embodiment of the illumination system of this invention.

FIG. 10 illustrates the $5^{th}$ embodiment of this invention of an Etendue Folding Illumination System 1000 that would be capable of achieving such an objective. Referring to FIG. 10, Etendue Folding Illumination System 1000 is comprised of a hollow or solid dielectric rectangular shaped cross section reflector 1010 having coupled onto its input aperture 1015 a light source 1020 which is comprised of multiple LED dies of multiple colors, and having coupled into its output aperture 1025 a reflective aperture stop 1030 having a clear aperture 1035 whose collimation angle, collimation axis 1036, area and aspect ratio matching a target etendue (typically the target etendue would be that of the micro-mirror imager used in the projection system). The long side of the rectangular cross section of the reflector 1010 is designed to achieve the desired collimation angle at the output aperture 1025 along the collimation axis 1036. The short side of the rectangular cross section of the reflector 1010 is designed to be at least equal to the target etendue dimension along that axis at the output aperture 1025. In effect the rectangular cross section of the reflector 1030 is designed to squeeze the etendue of LED device 1020 along the axis perpendicular to the collimation axis 1036 in order to best match the aspect ratio of the target etendue and achieve minimum vignetting.

In typical projection systems whereby the source etendue is larger than the target etendue, the dimension of the squeezed etendue would be much larger than that of the target etendue along the collimation axis, which would cause excessive flux efficiency degradation due to vignetting. However, the etendue folding aspects achieved by the combination of the reflector 1010 with the reflective aperture stop 1035 coupled into its output aperture 1025 and the reflective LED light source coupled into its input aperture 1015, would allow the Etendue Folding Illumination System 1000 illustrated in FIG. 10 to achieve efficiency improvements comparable to those explained earlier for the single reflector Etendue Folding Illumination System 300 while being able to match the target etendue collimation angle and area aspect ratio as well as its required collimation axis. In particular, since a squeezed target etendue restricts the collimation angle along only one axis, it follows that such a target etendue would typically be larger than a target etendue that restricts the collimation angle across its entire area by a factor that equals to $(1/\sin \Omega')$. Consequently, in being able to efficiently generate a squeezed etendue at its output clear aperture, the Etendue Folding Illumination System 1000 would also be able to operate at an increased value of target-to-source etendue ratio "g", and therefore be able to attain higher values of flux efficiency.

Figure 11A:
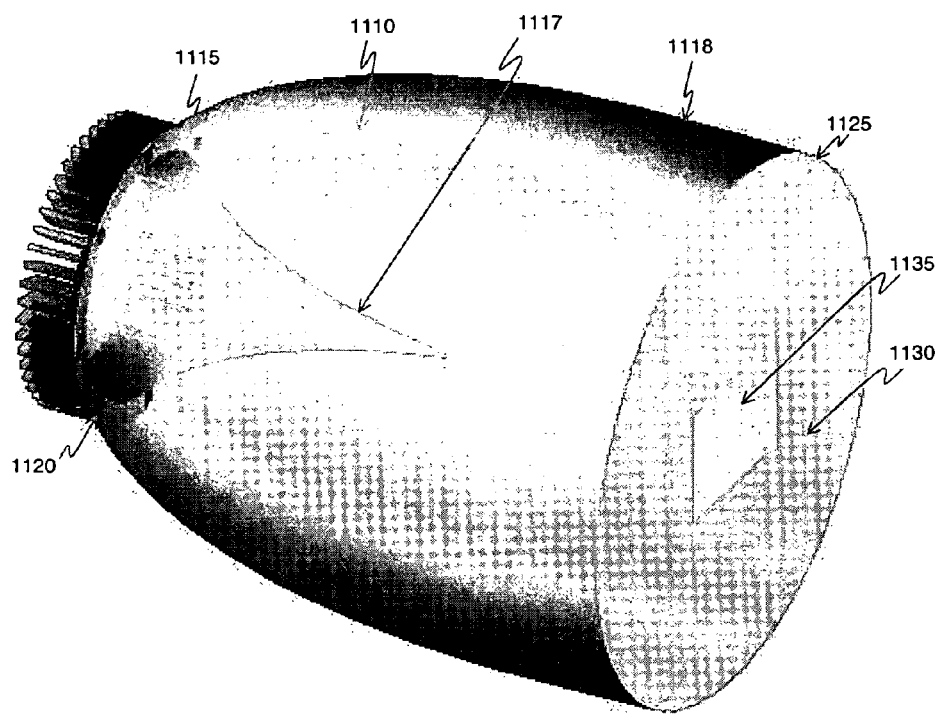
FIG. 11A illustrates cross-sectional and isometric views of the sixth embodiment of the illumination system of this invention.
Figure 11A:
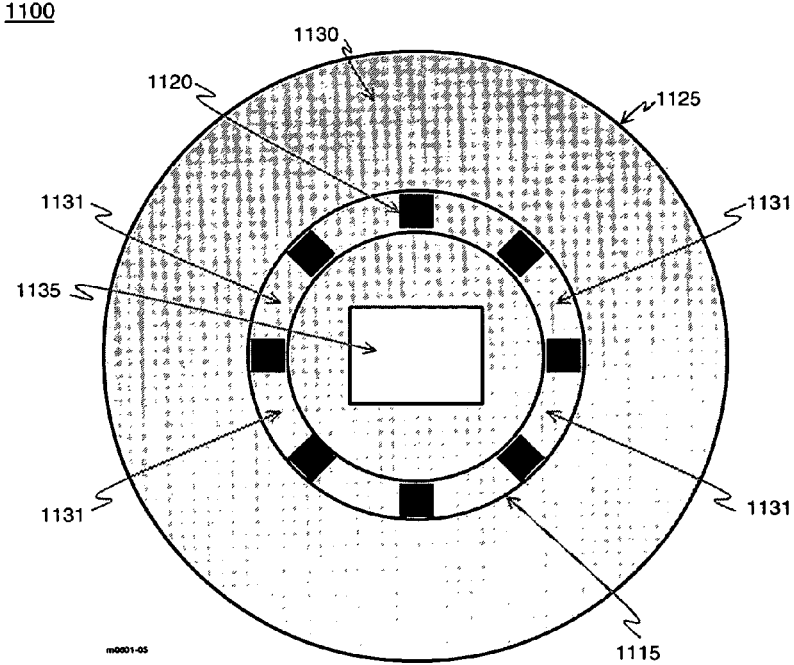

FIG. 11A illustrates the $6^{th}$ embodiment of this invention which takes advantage of the etendue folding aspects of this invention to realize the highly compact form-factor Etendue Folding Illumination System 1100 that is capable of achieving high levels of output flux while being able to efficiently match the target etendue collimation angle, area and aspect ratio. Referring to FIG. 11A, Etendue Folding Illumination System 1100 is comprised of a hollow or solid dielectric filled circular shaped cross section reflector 1110 having, either air gap or index matched, coupled onto its ring shaped input aperture 1115 a plurality of light sources 1120 each being comprised of one or multiple LED dies of multiple colors, and having coupled onto its output aperture 1125 a reflective aperture stop 1130 having a clear aperture 1135 having a collimation angle, area and aspect ratio that match a target etendue.

Figure 11B:
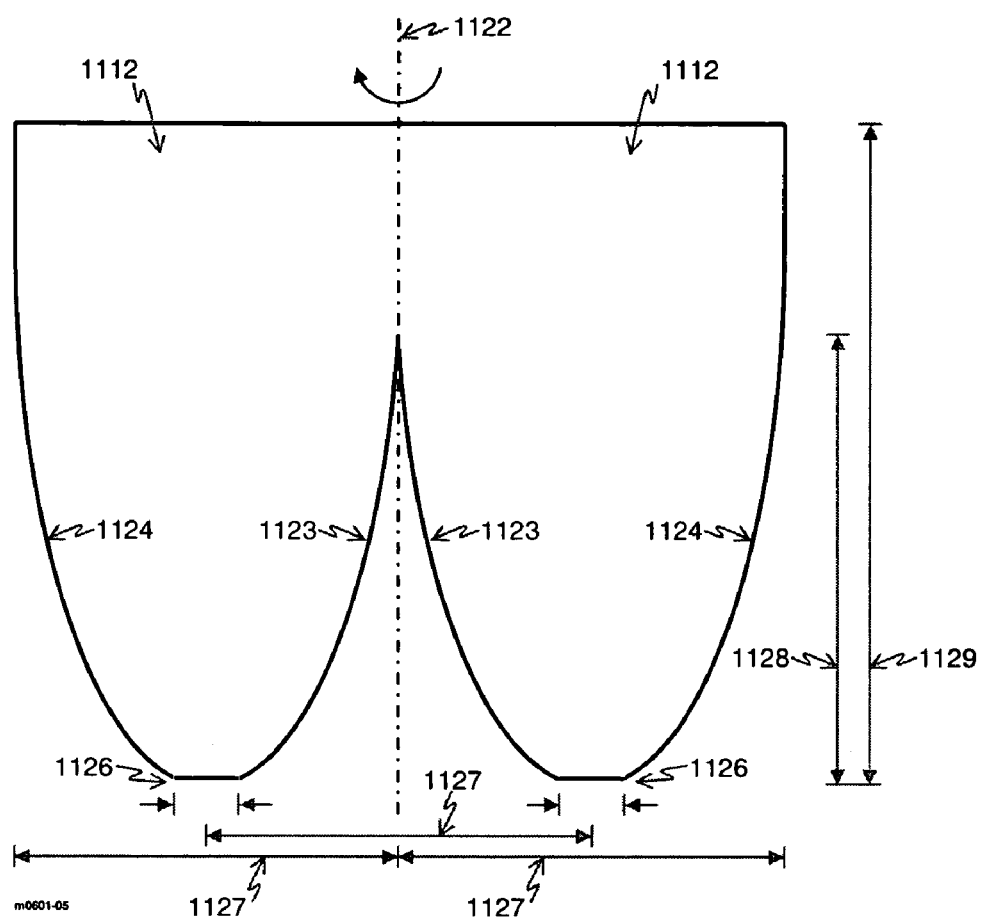
FIG. 11B illustrates vertical cross-sectional view of the sixth embodiment of the illumination system of this invention.

Referring to FIG. 11A, the reflector 1110 has a three dimensional (3-D) inner surface 1117 and a 3-D outer surface 1118 which are generated through a 180° rotation of the vertical cross section 1150 of two side-by-side reflector cross sections 1112 illustrated in FIG. 11B around the vertical axis 1122 that is centered between the two reflector cross sections 1112. Referring to FIG. 11B, the inner surface 1117 would be generated through a 180° rotation of the two inner sides 1123 of the two reflector cross sections 1112 around the vertical axis 1122, and the outer surface 1118 would generated through a 180° rotation of the two outer sides 1124 of the two reflector cross sections 1112 around the same vertical axis 1122. The width of the input end 1126 of each of the two reflector cross sections 1112 is designed to match the width of the LED dies 1120 coupled onto the input aperture of the Etendue Folding Illumination System 1100 and the width of the output end 1127 of each of the two reflector cross sections 1112 would be designed to achieve the collimation angle required at the output clear aperture 1135 of the Etendue Folding Illumination System 1100. The height 1128 of the two inner sides 1123 of the two reflector cross sections 1112 would be designed to achieve the collimation angle at the output clear aperture 1135 of Etendue Folding Illumination System 1100 and the height 1129 of the two outer sides 1124 of the two reflector cross sections 1112 would be designed to achieve the required level of uniformity at the output clear aperture 1135 of the Etendue Folding Illumination System 1100.

Referring to FIG. 11B, the input width 1126, designated by the symbol a, is designed to match that of the LED device 1120. The center-to-center width 1127, designated by the symbol a', would be designed to achieve the required collimation angle $\Omega'$ based on Equation (4), and the inner height 1128, designated by the symbol $L_{inner}$, at the intercept point of the two inner sides 1123 would be designed based on Equation (5). The 180° rotation of the vertical cross section 1150 illustrated in FIG. 11B around its vertical axis 1122 would result in the input aperture 1115 having a ring shape with inner and outer diameters that equal (a'−0.5 a) and (a'+ 0.5 a), respectively, and the circular shaped output aperture 1125 having a radius 1133 that equal 2 a'.

The outer side 1118 height 1129 of the reflector 1110, designated by the symbol $L_{outer}$, would be designed to achieve the required level of uniformity at the output clear aperture of the Etendue Folding Illumination System 1100 and would typically be twice the inner height:

$$L_{outer} \approx 2L_{inner} \quad (17)$$

where based on equation (5), the inner height 1132 of the reflector 1110, $L_{inner}$ would be given by:

$$L_{inner} = (a+a')/2 \tan \Omega' \quad (18)$$

FIG. 11A top view cross section illustration of the Etendue Folding Illumination System 1100 shows multiple LED devices 1120 coupled onto the ring shaped input aperture 1115, and also shows a rectangular shaped clear aperture 1135 that matches the area and aspect ratio of the target etendue incorporated within the circular shaped output aperture 1125. FIG. 11A top view cross section illustration shows the ring shaped input aperture 1115 being partially populated with LED devices 1120 with the ring input aperture 1115 and area 1131 in between the coupled LED devices 1120 being either coated with reflective material, in the case when Etendue Folding Illumination System 1100 is solid dielectric filled, or enclosed with a reflective surface, in the case when Etendue Folding Illumination System 1100 is hollow.

When fully populated with LED devices 1120, the maximum number of LED devices 1120 that can be coupled onto the ring shaped input aperture 1115, denoted by the symbol N, would be given by:

$$N = int[\pi/\tan^{-1}\{\sin \Omega'/(1-\sin \Omega')\}] \quad (19)$$

where int[x] denotes the integer value of x.

When number of LED devices 1120 coupled into the ring input aperture 1115 is n that is less than N; the reflectance factor R of the Etendue Folding Illumination System 1100 would be given by:

$$R = R_A R_W \{R_S(n/N) + R_B(1-n/N)\} \quad (20)$$

where $R_B$ designates the reflectance of the area 1131 of the ring shaped input aperture 1115 that is not populated with LED devices 1120. Typical value of the reflectance $R_B$ that can be achieved with commercially available reflective coating techniques would range from 0.9 to 0.98.

In the Etendue Folding Illumination System 1100 the light not exiting the clear aperture 1135 would be recycled through reflections between the reflective aperture stop 1130, the reflective ring shaped input aperture 1115 being partially or fully populated with the LED devices 1120 having reflective surface, and the inner and outer surfaces 1117 and 1118, respectively, of the reflector 1110. Similar to other embodiments of this invention, the reflector 1110 acts as a collimator for the light emitted from the reflective ring shaped input aperture 1115 being partially or fully populated with the LED devices 1120, and also acts as a concentrator for the light reflected by the reflective portion of the reflective aperture stop 1125. The flux efficiency and luminance gain that can be achieved by the Etendue Folding Illumination System 1100 are given by Equations (11) and (13), respectively, with the reflectance factor R given by Equation (20) and the target-to-source etendue ratio g being given by equation (8) with $G_S$ for a fully populated input aperture being the combined etendue value of the LED devices coupled into the ring input aperture 1115.

In addition to being able to attain the efficiency, vignetting, extraction and uniformity improvements comparable to those discussed earlier for the single reflector Etendue Folding Illumination System 300, the Etendue Folding Illumination System 1100 would be able to attain a substantially reduced form-factor. In order to illustrate this point, if the required collimation angle is 12°, then based on equation (19), a total of twelve LED dies can be coupled into the ring shaped input aperture 1115 of the Etendue Folding Illumination System 1100. If twelve 1×1 mm LED dies are coupled into the ring shaped input aperture 1115, then the base and top radii of the Etendue Folding Illumination System 1100 would be 5.3 mm and 8.2 mm; respectively, and its height would be 27.3 mm. In comparison if the twelve 1×1 mm LED were coupled as a single group into the matched input aperture of a prior art circular cross section illumination system, then its base and top radii would be 2.5 mm and 12 mm; respectively, and its height would be 68 mm. On the other hand if the twelve LED dies are divided into three groups with each group being comprised of four red, four green and four blue LED dies, with each group of four LED dies being coupled into the input aperture of a circular cross section illumination system with the output of the three illumination systems being combined with an assembly of dichroic reflectors, then the largest width of the illumination system assembly would be approximately 41 mm and its height would be approximately 52 mm. As can be seen from the preceding example, the radial configuration of the Etendue Folding Illumination System 1100 would achieve a smaller overall form-factor than either configurations of a prior art illumination systems-compared. This is of particular importance in compact projection system applications such as portable projectors and projection array systems.

The design of the Etendue Folding Illumination System 1100 derived from equations (15) through (20) would be optimized for achieving the required collimation angle uniformly across the output clear aperture 1125. A person skilled in the art would appreciate that other design criteria can be utilized to design an Etendue Folding Illumination System 1100 that would result in different dimensions than the design example outlined above.

An added advantage of the of the Etendue Folding Illumination System 1100 is that it does not require the use of a dichroic mirror assembly to combine the output of the multiple LED devices coupled into its ring shaped input aperture 1115, as a consequence the Etendue Folding Illumination System 900 would be more compact and more cost effective than other illumination systems having the same number of LED dies coupled onto their input aperture. Furthermore, an added advantage of the Etendue Folding Illumination System 1100 is that the spatial separation of the LED dies coupled into its ring shaped aperture 1115 would attain an improved thermal efficiency which would allow each individual LED die to be able to operate at a lower junction temperature, which would consequently result in an improvement the operational efficiency, in terms of the flux generated per watt, offered by each of LED dies.

In summary, the multiple embodiments of the Etendue Folding Illumination System of this invention in principal works as an "Etendue Adaptor" with an etendue at its input aperture that matches that of the light source and at its output aperture matching a desired much smaller target etendue. The multiple embodiments of the Etendue Folding Illumination System of this invention are capable of achieving higher luminous flux efficiency than prior art illumination systems because the luminous flux generated by the light source at its input aperture that falls outside the collection region of its output aperture is recycled back to the source etendue and integrated with the input luminous flux rather than being permanently lost. With this feature, the multiple embodiments of the Etendue Folding Illumination System of this invention are capable of efficiently coupling the light generated by a source having a large etendue, such as light emitting diodes (LED), into a micro-display imager having a much smaller etendue, such as those used in projection systems, without excessive loss of flux. In achieving high luminous flux efficiency (efficiently conserving luminous flux) while being able to map a large etendue at its input into a smaller output etendue, the multiple embodiments of the illumination system of this invention are capable of achieving luminance at their output apertures that is higher than the luminance of the LED light source coupled onto their input aperture—meaning that the multiple embodiments of the Etendue Folding Illumination System of this invention would be capable of achieving a luminance gain.

Furthermore, the multiple embodiments of the Etendue Folding Illumination System of this invention overcome multiple weaknesses of prior art LED-based illumination systems that target projection systems applications, and offers several advantages, including:

1. The ability to efficiently couple the large etendue typical to light source comprised of multiple LED dies with a much smaller etendue of the imager used in typical projection systems;
2. The ability to match the target imager etendue while maximizing the conservation of flux;
3. The ability to substantially decouple the aspect ratios of the input and output apertures, enabling efficient matching of the aspect ratio of the LED light source at the input aperture while independently and efficiently matching of the aspect ratio of the target etendue at the output aperture;
4. The ability to match the target imager area, collimation angle, aspect ratio and illumination axis orientation, thus substantially reducing the degradation in flux efficiency due to vignetting;
5. The ability to tailor the shape of the generated illumination patch to compensate for the illumination axis inclination;
6. The ability to efficiently harness the increase in flux that can result in by light extraction improvement when index matched coupling is used;
7. The ability to achieve a more uniform irradiance profile without the need for additional homogenizing means;
8. The ability to achieve effective combining of the light generated from multiple color LED dies without the use of dichroic combining mirror, thus being more cost effective;
9. The ability to allow spatial separation between the LED dies coupled into the input aperture, thus allowing the LED devices to operate at higher thermal efficiency; and
10. The ability to attain small form-factor that would be beneficial for multiple projection systems applications.

In the forgoing detailed description, the present invention has been described with reference to specific embodiments thereof. It will, however, be evident that various modifications and changes can be made thereto without departing from the broader spirit and scope of the invention. The design details and drawings are, accordingly, to be regarded in an illustrative rather than a restrictive sense. Skilled persons will recognize that portions of this invention may be implemented differently than the implementation described above for the preferred embodiment. For example, skilled persons will appreciate that the multiple embodiments of the Etendue Folding Illumination System of this invention can be implemented with numerous variations to the number reflectors used, the specific design details of the reflectors, the specific details of the means for combining the light output of the multiple reflectors used, and the specific design details of the means for coupling the LED dies onto the aperture of the reflectors used, the specific thermal management design details. Skilled persons will further recognize that many changes may be made to the details of the aforementioned embodiments of this invention without departing from the underlying principles thereof. The scope of the present invention should, therefore, be determined only by the following claims.

What is claimed is:

1. An etendue folding illumination system for illuminating a target etendue comprising:
   a folded collimator/concentrator having an input aperture at a first end of the folded collimator/concentrator, and an output aperture at a second end of the folded collimator/concentrator opposite the first end, the folded collimator/concentrator being a compound reflector having a reflective inner surface;
   a substantially flat reflective aperture stop coupled to the output aperture of the folded collimator/concentrator, the reflective aperture stop having an output clear aperture whose collimation angle, area and aspect ratio match corresponding parameters of the target etendue;

a Light Emitting Diode (LED) device coupled to the input aperture of the folded collimator/concentrator, the LED device including at least one LED die having a flat reflective surface with a surface reflectance of at least 0.7 facing the output aperture;

light emitted by the LED device and reflected by the reflective aperture stop passing back into the compound reflector for further reflection by the reflective inner surface of the folded collimator/concentrator, the flat reflective surface of the LED die, or both the reflective inner surface of the folded collimator/concentrator and the flat reflective surface of the LED die.

2. The etendue folding illumination system of claim 1 wherein the LED device comprises a plurality of LED dies, and wherein the input aperture area between LED dies has a reflective surface facing the output aperture.

3. The etendue folding illumination system of claim 1 wherein the folded collimator/concentrator has a rectangular cross section and has a shape selected from the group of shapes consisting of a compound parabolic concentrator (CPC), a compound hyperbolic concentrator (CHC), and a compound elliptical concentrator (CEC).

4. The etendue folding illumination system of claim 1 wherein:

light flux generated by the LED device is integrated with light flux recycled by the reflective aperture stop and reflected by the flat reflective surface of the LED die; the integrated light flux is collimated by the folded collimator/concentrator until reaching the reflective aperture stop, where a portion of the integrated light flux exits the output clear aperture and a portion of the integrated light flux which is reflected by the reflective portion of the aperture stop is re-coupled into the folded collimator/concentrator and concentrated by the folded collimator/concentrator in its way back to the same reflective source etendue it had originally emerged from.

5. The etendue folding illumination system of claim 4 wherein the etendue of the LED device is the collective light emitting surface of the at least one LED die and the surface of the at least one LED die is made reflective by incorporation of a light flux extraction improvement means.

6. The etendue folding illumination system of claim 5 wherein the light flux extraction improvement means comprises intra-die light recycling or the use of a photonic lattice.

7. The etendue folding illumination system of claim 4 wherein the integration, collimation, recycling and concentration of light flux in the folded collimator/concentrator and the reflective apertures collectively enable the etendue folding illumination system to be configured to substantially decouple the aspect ratios of its input and output clear apertures, allowing the etendue folding illumination system to substantially match the aspect ratio of the target etendue at its output clear aperture while independently substantially match the aspect ratio of the LED device at its input aperture.

8. The etendue folding illumination system of claim 1 wherein the folded collimator/concentrator acts as a light flux integrator, a collimator of the integrated light flux and as a concentrator of the recycled light flux.

9. The etendue folding illumination system of claim 1 wherein the folded collimator/concentrator functions as an etendue adaptor converting the etendue of the LED device into a smaller target etendue that matches the required target etendue in area and angle of divergence to improve light flux efficiency and to reduce vignetting losses.

10. The etendue folding illumination system of claim 1 configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrator and the composite reflectance at the input aperture.

11. The etendue folding illumination system of claim 1 wherein the folded collimator/concentrator is solid dielectric filled and the LED device is index matched coupled to the input aperture of the folded collimator/concentrator to increase the light flux by improving extraction efficiency.

12. The etendue folding illumination system of claim 1 wherein the folded collimator/concentrator is configured to substantially homogenize the light flux generated by the LED device before the light flux exits the output clear aperture without the need for additional homogenizing means.

13. The etendue folding illumination system of claim 1 wherein the output clear aperture reduces vignetting by substantially matching the target etendue area and aspect ratio of either 4:3 or 16:9, and by tailoring the output shape to match the shape of the target etendue projected at an inclined angle.

14. The etendue folding illumination system of claim 1 further comprising projection apparatus for projecting an image illuminated by the etendue folding illumination system.

15. An etendue folding illumination system for illuminating a target etendue comprising:

two folded collimator/concentrators, each having an input aperture at a first end of the folded collimator/concentrator, and an output aperture at a second end of the folded collimator/concentrator opposite the first end, the folded collimator/concentrators each being a compound reflector having a reflective inner surface;

a light combining assembly configured to couple light flux output of the two folded collimator/concentrators into an output aperture of the etendue folding illumination system;

the first folded collimator/concentrator having either air gap or index matched coupled onto its input aperture a light source having a plurality of green LED dies, each LED die having a flat reflective surface with a surface reflectance of at least 0.7 facing its output aperture, and the second folded collimator/concentrator having either air gap or index matched coupled onto its input aperture a light source that is comprised of plurality of red and blue LED dies, each LED die having a flat reflective surface with a surface reflectance of at least 0.7 facing its output aperture, substantially flat reflective aperture stops coupled to each of the output apertures of the folded collimator/concentrators, each reflective aperture stop having an output clear aperture whose collimation angle, area and aspect ratio match corresponding parameters of the target etendue;

light emitted by the LED dies and reflected by the reflective aperture stops passing back into the compound reflectors for further reflection by the reflective inner surfaces of the folded collimator/concentrators, the flat reflective surfaces of the LED dies, or both the reflective inner surface of the folded collimator/concentrators and the flat reflective surfaces of the LED dies.

16. The etendue folding illumination system of claim 15 wherein each folded collimator/concentrator either is hollow or solid dielectric filled, has a cross section selected from the group consisting of circular, square and rectangular, and has a shape selected from the group of shapes consisting of a compound parabolic concentrator (CPC), a compound hyperbolic concentrator (CHC), and a compound elliptical concentrator (CEC).

17. The etendue folding illumination system of claim 15 wherein:
the combining assembly is configured to relay the light emerging from the output clear apertures of the two folded collimator/concentrators onto the output aperture of the etendue folding illumination system and being comprised of a six prism assembly coupled onto the output clear apertures of the two folding collimator/concentrators, the six prisms each having a right angle triangular cross section with two equal short sides and one long side and being of three types;
the first type prism having its short side having an area that is substantially equal the area and aspect ratio of the respective output clear aperture of a respective folded collimator/concentrator and its long side coated with a reflective coating;
the second prism type having its long side having an area that is substantially equal the area and aspect ratio of the output clear aperture of a respective folded collimator/concentrator and its short sides coated with green reflective dichroic coating; and,
the third prism type having its long side having an area that is substantially equal the area and aspect ratio of the output clear aperture of a respective folded collimator/concentrator and its short sides coated with red and blue reflective dichroic coating.

18. The etendue folding illumination system of claim 15 wherein the output clear apertures of each of the folded collimator/concentrators are smaller than the adjacent cross sectional area of the respective folded collimator/concentrator, the two output clear apertures being placed such that the light flux coupled from the two folded collimator/concentrators into the light combining assembly experiences substantially equal optical path lengths.

19. The etendue folding illumination system of claim 15 wherein the coupling of the light flux of all the LED dies into the input apertures of the two folded collimator/concentrators allows each of the two folded collimator/concentrators to operate at a higher value of target-to-source etendue to improve their flux efficiency, and allows the two groups of LED dies to operate at lower junction temperature to improve their operational efficiency in flux generated per watt, in comparison to that offered by the aggregate group of LED dies operating in a single cluster.

20. The etendue folding illumination system of claim 15 wherein:
the folded collimator/concentrators are either hollow or solid dielectric filled and the LED dies are air gap coupled onto their input apertures;
light flux generated by the LED dies is integrated with light flux recycled by the reflective aperture stops and reflected by the reflective surface of the LED dies;
the integrated light flux is collimated by the folded collimator/concentrators until reaching the reflective aperture stops, where a portion of the integrated light flux exits the respective output clear aperture and a portion of the integrated light flux which is reflected by the reflective portion of the aperture stop is re-coupled into the respective folded collimator/concentrator and concentrated by the folded collimator/concentrator in its way back to the same reflective source etendue it had originally emerged from;
the folded collimator/concentrators and reflective aperture stops acting as a light flux integrator, a collimator of the integrated light flux and as a concentrator of the recycled light flux, to homogenize the light flux and as an etendue adaptor converting the etendue of the LED-based light source into a smaller target etendue to improve light flux efficiency and to reduce vignetting losses, and substantially decoupling the aspect ratios of input and output clear apertures, allowing the etendue folding illumination system to substantially match the aspect ratio of the target etendue at its output clear aperture while independently substantially matching the aspect ratio of the LED light source at its input aperture;
the etendue of each light source being the collective light emitting surface of the plurality of LED dies coupled onto the input aperture of each of the two collimator/concentrators and the reflective surface of the LED dies being reflective as a consequence of incorporation of a light flux extraction improvement means;
the output clear aperture reducing vignetting by substantially matching the target etendue area and aspect ratio of either 4:3 or 16:9, and by tailoring the output shape to match the shape of the target etendue projected at an inclined angle;
the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrators and the composite reflectance at the input apertures.

21. The etendue folding illumination system of claim 15 wherein:
the folded collimator/concentrators are solid dielectric filled and the LED dies are index matched coupled onto their input apertures to increase the light flux by improving extraction efficiency;
light flux generated by the LED dies is integrated with light flux recycled by the reflective aperture stops and reflected by the reflective surface of the LED dies;
the integrated light flux is collimated by the folded collimator/concentrators until reaching the reflective aperture stops, where a portion of the integrated light flux exits the respective output clear aperture and a portion of the integrated light flux which is reflected by the reflective portion of the aperture stop is re-coupled into the respective folded collimator/concentrator and concentrated by the folded collimator/concentrator in its way back to the same reflective source etendue it had originally emerged from;
the folded collimator/concentrators and reflective aperture stops acting as a light flux integrator, a collimator of the integrated light flux and as a concentrator of the recycled light flux, to homogenize the light flux and as an etendue adaptor converting the etendue of the LED-based light source into a smaller target etendue to improve light flux efficiency and to reduce vignetting losses, and substantially decoupling the aspect ratios of input and output clear apertures, allowing the etendue folding illumination system to substantially match the aspect ratio of the target etendue at its output clear aperture while independently substantially matching the aspect ratio of the LED light source at its input aperture;
the etendue of each light source being the collective light emitting surface of the plurality of LED dies coupled onto the input aperture of each of the two collimator/ concentrators and the reflective surface of the LED dies being reflective as a consequence of incorporation of a light flux extraction improvement means;

the output clear aperture reducing vignetting by substantially matching the target etendue area and aspect ratio of either 4:3 or 16:9, and by tailoring the output shape to match the shape of the target etendue projected at an inclined angle;

the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrators and the composite reflectance at the input apertures.

22. The etendue folding illumination system of claim 15 further comprising projection apparatus for projecting an image illuminated by the etendue folding illumination system.

23. An etendue folding illumination system for illuminating a target etendue comprising:

three folded collimator/concentrators, each having an input aperture at a first end of the folded collimator/concentrator, and an output aperture at a second end of the folded collimator/concentrator opposite the first end, the folded collimator/concentrators each being a compound reflector having a reflective inner surface;

a light combining assembly configured to couple the light flux output of the three folded collimator/concentrators into an output aperture of the etendue folding illumination system;

the first folded collimator/concentrator having either air gap or index matched coupled onto its input aperture a light source comprising at least one green LED die, each LED die having a flat reflective surface with a surface reflectance of at least 0.7 facing its output aperture;

the second folded collimator/concentrator having either air gap or index matched coupled onto its input aperture a light source comprising at least one red LED die, each LED die having a flat reflective surface with a surface reflectance of at least 0.7 facing its output aperture;

the third folded collimator/concentrator having either air gap or index matched coupled onto its input aperture a light source comprising at least one blue LED die, each LED die having a flat reflective surface with a surface reflectance of at least 0.7 facing its output aperture;

substantially flat reflective aperture stops coupled to each of the output apertures of the three folded collimator/concentrators, each reflective aperture stop having an output clear aperture whose collimation angle, area and aspect ratio match corresponding parameters of the target etendue;

light emitted by the LED dies and reflected by the reflective aperture stops passing back into the compound reflectors for further reflection by the reflective inner surfaces of the folded collimator/concentrators, the flat reflective surfaces of the LED dies, or both the reflective inner surface of the folded collimator/concentrators and the flat reflective surfaces of the LED dies.

24. The etendue folding illumination system of claim 23 wherein each of the three folded collimator/concentrators is either hollow or solid dielectric filled, has a cross section selected from the group consisting of circular, square and rectangular, has a shape selected from the group of shapes consisting of a compound parabolic concentrator (CPC), a compound hyperbolic concentrator (CHC), and a compound elliptical concentrator (CEC), and has coupled onto its output aperture a reflective aperture stop incorporating the output clear aperture of the respective folded collimator/concentrators.

25. The etendue folding illumination system of claim 23 wherein:

the combining assembly is configured to relay the light emerging from the output clear apertures of the three folded collimator/concentrators onto the output aperture of the etendue folding illumination system and being comprised of an assembly comprising four combining prisms, two reflective mirrors, and two relay lenses;

the first set of reflective mirror and relay lens are configured to couple the output light of the second folding collimator/concentrator into the combining prism assembly;

the second set of reflective mirror and relay lens are configured to couple the output light of the third folding collimator/concentrator into the combining prism assembly;

the prism assembly comprising two different types of prisms, each having a right angle triangular cross section with two equal short sides and one long side; and, the first type of prism having one of its short sides coated with blue reflective dichroic coating and the second type of prism having one of its short sides coated with red reflective dichroic coating.

26. The etendue folding illumination system of claim 25 wherein:

the second and third collimator/concentrators each have a collimation angle that is smaller than the collimation angle of the target etendue;

the height of the second and third collimator/concentrators is extended with vertical reflective walls; and, the relay lenses are configured to make the collimation angle of the output light coupled from the clear apertures of second and third collimator/concentrators substantially match the collimation angle of the target etendue;

whereby the optical path length of the coupling from the clear apertures of the three collimator/concentrators into the combining prism assembly are made substantially equal.

27. The etendue folding illumination system of claim 23 wherein each of the three folded collimator/concentrators have substantially identical clear aperture characteristics and have a different target-to-source etendue ratio, with the number of green LED dies coupled onto the input aperture of the first folded collimator/concentrator being substantially equal to the number of the red LED dies coupled onto the input aperture of the second folded collimator/concentrator plus the number of the blue LED dies coupled onto the input aperture of the third folded collimator/concentrator, thus allowing the etendue folding illumination system to generate a full color gamut at the target etendue.

28. The etendue folding illumination system of claim 23 wherein the coupling of the light flux of all the LED dies into the input apertures of the three folded collimator/concentrators allows each of the folded collimator/concentrators to operate at a higher value of target-to-source etendue to improve their flux efficiency, and allows the three groups of LED dies to operate at lower junction temperature to improve their operational efficiency in flux generated per watt, in comparison to that offered by the aggregate group of LED dies operating in a single cluster.

29. The etendue folding illumination system of claim 23 wherein:
- the folded collimator/concentrators are either hollow or solid dielectric filled and the LED dies are air gap coupled onto their input apertures;
- light flux generated by the LED dies is integrated with light flux recycled by the reflective aperture stops and reflected by the reflective surface of the LED dies;
- the integrated light flux is collimated by the folded collimator/concentrators until reaching the reflective aperture stops, where a portion of the integrated light flux exits the respective output clear aperture and a portion of the integrated light flux which is reflected by the reflective portion of the aperture stop is re-coupled into the respective folded collimator/concentrator and concentrated by the folded collimator/concentrator in its way back to the same reflective source etendue it had originally emerged from;
- the folded collimator/concentrators and reflective aperture stops acting as a light flux integrator, a collimator of the integrated light flux and as a concentrator of the recycled light flux, to homogenize the light flux and as an etendue adaptor converting the etendue of the LED-based light source into a smaller target etendue to improve light flux efficiency and to reduce vignetting losses, and to substantially decouple the aspect ratios of input and output clear apertures, allowing the etendue folding illumination system to substantially match the aspect ratio of the target etendue at its output clear aperture while independently substantially matching the aspect ratio of the LED light sources at its input apertures;
- the etendue of each light source being the collective light emitting surface of the plurality of LED dies coupled onto the input aperture of each of the three collimator/concentrators and the reflective surface of the LED dies being reflective as a consequence of incorporation of a light flux extraction means;
- the output clear aperture reducing vignetting by substantially matching the target etendue area and aspect ratio of either 4:3 or 16:9, and by tailoring the output shape to match the shape of the target etendue projected at an inclined angle;
- the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrators and the composite reflectance at the input apertures.

30. The etendue folding illumination system of claim 23 wherein:
- the folded collimator/concentrators are solid dielectric filled and the LED dies are index matched coupled onto their input apertures to increase the light flux by improving extraction efficiency;
- light flux generated by the LED dies is integrated with light flux recycled by the reflective aperture stops and reflected by the reflective surface of the LED dies;
- the integrated light flux is collimated by the folded collimator/concentrators until reaching the reflective aperture stops, where a portion of the integrated light flux exits the respective output clear aperture and a portion of the integrated light flux which is reflected by the reflective portion of the aperture stop is re-coupled into the respective folded collimator/concentrator and concentrated by the folded collimator/concentrator in its way back to the same reflective source etendue it had originally emerged from;
- the folded collimator/concentrators and reflective aperture stops acting as a light flux integrator, a collimator of the integrated light flux and as a concentrator of the recycled light flux, to homogenize the light flux and as an etendue adaptor converting the etendue of the LED-based light source into a smaller target etendue to improve light flux efficiency and to reduce vignetting losses, and to substantially decouple the aspect ratios of input and output clear apertures, allowing the etendue folding illumination system to substantially match the aspect ratio of the target etendue at its output clear aperture while independently substantially matching the aspect ratio of the LED light sources at its input apertures;
- the etendue of each light source being the collective light emitting surface of the plurality of LED dies coupled onto the input aperture of each of the three collimator/concentrators and the reflective surface of the LED dies being reflective as a consequence of incorporation of a light flux extraction means;
- the output clear aperture reducing vignetting by substantially matching the target etendue area and aspect ratio of either 4:3 or 16:9, and by tailoring the output shape to match the shape of the target etendue projected at an inclined angle;
- the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrators and the composite reflectance at the input apertures.

31. The etendue folding illumination system of claim 23 further comprising projection apparatus for projecting an image illuminated by the etendue folding illumination system.

32. An etendue folding illumination system for illuminating a target etendue comprising:
- four folded collimator/concentrators arranged in a tiled configuration, each folded collimator/concentrator having an input aperture at a first end of the folded collimator/concentrator, the folded collimator/concentrators having their heights extended and conjoined to form a combining stem having a single conjoined output aperture at a second end of the folded collimator/concentrators opposite the first ends, the folded collimator/concentrators each being a compound reflector having a reflective inner surface;
- each of the folded collimator/concentrators having either air gap or index matched coupled onto its input aperture a light source comprising a plurality of LED dies of the same or multiple colors, each LED die having a flat reflective surface with a surface reflectance of at least 0.7 facing its output aperture;
- a substantially flat reflective aperture stop coupled to the output aperture of the folded collimator/concentrators, the reflective aperture stop having an output clear aperture whose collimation angle, area and aspect ratio match corresponding parameters of the target etendue;
- light emitted by the LED dies and reflected by the reflective aperture stops passing back into the compound reflectors for further reflection by the reflective inner surfaces of the folded collimator/concentrators, the flat reflective surfaces of the LED dies, or both the reflective inner surface of the folded collimator/concentrators and the flat reflective surfaces of the LED dies.

33. The etendue folding illumination system of claim 32 wherein each folded collimator/concentrator is either hollow or solid dielectric filled, has a cross section selected from the group consisting of square and rectangular, and has a shape selected from the group of shapes consisting of a compound parabolic concentrator (CPC), a compound hyperbolic concentrator (CHC), and a compound elliptical concentrator (CEC).

34. The etendue folding illumination system of claim 32 wherein the coupling of the light flux of all the LED dies into the input apertures of the four folded collimator/concentrators allows each of the folded collimator/concentrators to operate at a higher value of target-to-source etendue to improve their flux efficiency, and allows the four groups of LED dies to operate at lower junction temperature to improve their operational efficiency in flux generated per watt, in comparison to that offered by the aggregate group of LED dies operating in a single cluster.

35. The etendue folding illumination system of claim 33 wherein:
the folded collimator/concentrators are either hollow or solid dielectric filled and the LED dies are air gap coupled onto their input apertures;
light flux generated by the LED dies is integrated with light flux recycled by the reflective aperture stops and reflected by the reflective surface of the LED dies;
the integrated light flux is collimated by the folded collimator/concentrators until reaching the reflective aperture stops, where a portion of the integrated light flux exits the output clear aperture and a portion of the integrated light flux which is reflected by the reflective portion of the aperture stop is re-coupled into the folded collimator/concentrators and concentrated by the folded collimator/concentrators in its way back to the same reflective source etendue it had originally emerged from;
the folded collimator/concentrators and reflective aperture stop acting as a light flux integrator, a collimator of the integrated light flux and as a concentrator of the recycled light flux, to homogenize the light flux and as an etendue adaptor converting the etendue of the LED-based light source into a smaller target etendue to improve light flux efficiency and to reduce vignetting losses, and substantially decouples the aspect ratios of input and output clear apertures, allowing the etendue folding illumination system to substantially match the aspect ratio of the target etendue at its output clear aperture while independently substantially match the aspect ratio of the LED light sources at its input aperture;
the etendue of each light source being the collective light emitting surface of the plurality of LED dies coupled onto the input aperture of each of the four collimator/concentrators and the reflective surface of the LED dies being reflective as a consequence of incorporation of a light flux extraction improvement;
the output clear aperture reducing vignetting by substantially matching the target etendue area and aspect ratio of either 4:3 or 16:9, and by tailoring the output shape to match the shape of the target etendue projected at an inclined angle;
the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrators and the composite reflectance at the input apertures.

36. The etendue folding illumination system of claim 32 wherein:
the folded collimator/concentrators being solid dielectric filled and the LED dies being index matched coupled to their input apertures to increase the light flux by improving extraction efficiency;
light flux generated by the LED dies is integrated with light flux recycled by the reflective aperture stops and reflected by the reflective surface of the LED dies;
the integrated light flux is collimated by the folded collimator/concentrators until reaching the reflective aperture stops, where a portion of the integrated light flux exits the output clear aperture and a portion of the integrated light flux which is reflected by the reflective portion of the aperture stop is re-coupled into the folded collimator/concentrators and concentrated by the folded collimator/concentrators in its way back to the same reflective source etendue it had originally emerged from;
the folded collimator/concentrators and reflective aperture stop acting as a light flux integrator, a collimator of the integrated light flux and as a concentrator of the recycled light flux, to homogenize the light flux and as an etendue adaptor converting the etendue of the LED-based light source into a smaller target etendue to improve light flux efficiency and to reduce vignetting losses, and substantially decouples the aspect ratios of input and output clear apertures, allowing the etendue folding illumination system to substantially match the aspect ratio of the target etendue at its output clear aperture while independently substantially match the aspect ratio of the LED light sources at its input aperture;
the etendue of each light source being the collective light emitting surface of the plurality of LED dies coupled onto the input aperture of each of the four collimator/concentrators and the reflective surface of the LED dies being reflective as a consequence of incorporation of a light flux extraction improvement;
the output clear aperture reducing vignetting by substantially matching the target etendue area and aspect ratio of either 4:3 or 16:9, and by tailoring the output shape to match the shape of the target etendue projected at an inclined angle;
the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrators and the composite reflectance at the input apertures.

37. The etendue folding illumination system of claim 32 wherein the extended length of the folded collimator/concentrators conjoined together combines the output of the four folded collimator/concentrators without requiring the use of a dichroic mirror assembly, thus making the etendue folding illumination system more compact and more cost effective than other illumination systems having the same number of LED dies coupled into their input aperture.

38. The etendue folding illumination system of claim 32 wherein the tiled configuration of the four collimator/concentrators enables the etendue folding illumination system to have a substantially reduced form-factor in comparison with an illumination system having the same total number of LED dies coupled into its input aperture and operating at the same target-to-source etendue ratio.

39. The etendue folding illumination system of claim 32 further comprising projection apparatus for projecting an image illuminated by the etendue folding illumination system.

40. An etendue folding illumination system for illuminating a target etendue comprising:
  a folded collimator/concentrator having an input aperture at a first end of the folded collimator/concentrator, and an output aperture at a second end of the folded collimator/concentrator opposite the first end, the folded collimator/concentrator being a compound reflector having a reflective inner surface;
  a light source coupled to the input aperture of the folded collimator/concentrator, the light source having a plurality of light emitting diode (LED) dies of one or multiple colors providing light flux into the folded collimator/concentrator, the LED dies having a flat reflective surface with a surface reflectance of at least 0.7 facing the output aperture;
  a substantially flat reflective aperture stop coupled to the output aperture of the folded collimator/concentrator, the reflective aperture stop having an output clear aperture whose collimation angle, area and aspect ratio match corresponding parameters of the target etendue;
  light emitted by the LED dies and reflected by the reflective aperture stop passing back into the compound reflector for further reflection by the reflective inner surface of the folded collimator/concentrator, the flat reflective surfaces of the LED dies, or both the reflective inner surface of the folded collimator/concentrator and the flat reflective surfaces of the LED dies.

41. The etendue folding illumination system of claim 40 wherein the folded collimator/concentrator is either hollow or solid dielectric filled, has a rectangular cross section shaped and is either a compound parabolic concentrator (CPC), a compound hyperbolic concentrator (CHC), or a compound elliptical concentrator (CEC), and the light flux from the LED dies is coupled into the input aperture of folded collimator/concentrator by either air gap or index matched coupling.

42. The etendue folding illumination system of claim 40 wherein the folded collimator/concentrator has a rectangular cross section and is configured to substantially squeeze the source etendue of the LED dies coupled into its input aperture along an axis perpendicular to a required collimation axis by having a long side of its cross section adjacent the output clear aperture configured to attain the required target etendue collimation angle along the required collimation axis and a short side of its cross section adjacent the output clear aperture substantially equal to the corresponding dimension of the target etendue.

43. The etendue folding illumination system of claim 42 wherein the etendue squeezing enables the etendue folding illumination system to operate at a higher target-to-source etendue and to attain higher flux efficiency than without such etendue squeezing.

44. The etendue folding illumination system of claim 40 wherein:
  the folded collimator/concentrators are either hollow or solid dielectric filled and the LED dies are air gap coupled onto their input apertures;
  light flux generated by the LED dies being integrated with light flux recycled by the reflective aperture stop and reflected by the reflective surface of the LED dies;
  the integrated light flux is collimated by the folded collimator/concentrator until reaching the reflective aperture stop, where a portion of the integrated light flux exits the output clear aperture and a portion of the integrated light flux is reflected by the reflective portion of the aperture stop and re-coupled into the respective folded collimator/concentrator and concentrated by the folded collimator/concentrator in its way back to the same reflective source etendue it had originally emerged from;
  the folded collimator/concentrator and reflective aperture stop act as a light flux integrator, a collimator of the integrated light flux and as a concentrator of the recycled light flux, and act to homogenize the light flux and as an etendue adaptor converting the etendue of the LED-based light source into a smaller target etendue to improve light flux efficiency and to reduce vignetting losses, and substantially decouple the aspect ratios of input aperture and output clear aperture, allowing the etendue folding illumination system to substantially match the aspect ratio of the target etendue at its output clear aperture while independently substantially matching the aspect ratio of the LED light sources at its input aperture;
  the etendue of each light source being the collective light emitting surface of the plurality of LED dies and the reflective surface of the LED dies being reflective as a consequence of incorporation of a light flux extraction means;
  the output clear aperture reducing vignetting by substantially matching the target etendue area and aspect ratio of either 4:3 or 16:9, and by tailoring the output shape to match the shape of the target etendue projected at an inclined angle;
  the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrator and the composite reflectance at the input aperture.

45. The etendue folding illumination system of claim 40 wherein:
  the folded collimator/concentrator is solid dielectric filled and the LED dies are index matched coupled to their input apertures to increase the light flux by improving extraction efficiency;
  light flux generated by the LED dies being integrated with light flux recycled by the reflective aperture stop and reflected by the reflective surface of the LED dies;
  the integrated light flux is collimated by the folded collimator/concentrator until reaching the reflective aperture stop, where a portion of the integrated light flux exits the output clear aperture and a portion of the integrated light flux is reflected by the reflective portion of the aperture stop and re-coupled into the respective folded collimator/concentrator and concentrated by the folded collimator/concentrator in its way back to the same reflective source etendue it had originally emerged from;
  the folded collimator/concentrator and reflective aperture stop act as a light flux integrator, a collimator of the integrated light flux and as a concentrator of the recycled light flux, and act to homogenize the light flux and as an etendue adaptor converting the etendue of the LED-based light source into a smaller target etendue to improve light flux efficiency and to reduce vignetting losses, and substantially decouple the aspect ratios of input aperture and output clear aperture, allowing the etendue folding illumination system to substantially match the aspect ratio of the target etendue at its output clear aperture while independently substantially matching the aspect ratio of the LED light sources at its input aperture;

the etendue of each light source being the collective light emitting surface of the plurality of LED dies and the reflective surface of the LED dies being reflective as a consequence of incorporation of a light flux extraction means;

the output clear aperture reducing vignetting by substantially matching the target etendue area and aspect ratio of either 4:3 or 16:9, and by tailoring the output shape to match the shape of the target etendue projected at an inclined angle;

the etendue folding illumination system being configured to achieve luminance gain and flux efficiency improvement relative to a conventional illumination system that are substantially determined by a factor $[1/(1-x)]$, where x equals one minus the value of the target-to-source etendue ratio multiplied by a compounded reflectance of the folded collimator/concentrator and the composite reflectance at the input aperture.

46. The etendue folding illumination system of claim 40 configured to match a target etendue collimation angle along a required collimation axis to efficiently illuminate a micromirror type imager.

47. The etendue folding illumination system of claim 40 further comprising projection apparatus for projecting an image illuminated by the etendue folding illumination system.

\* \* \* \* \*